(12) United States Patent
Sun et al.

(10) Patent No.: US 12,551,177 B2
(45) Date of Patent: Feb. 17, 2026

(54) X-RAY MACHINES

(71) Applicant: SHANGHAI UNITED IMAGING HEALTHCARE CO., LTD., Shanghai (CN)

(72) Inventors: Biao Sun, Shanghai (CN); Bo Shi, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 364 days.

(21) Appl. No.: 18/167,825

(22) Filed: Feb. 10, 2023

(65) Prior Publication Data

US 2023/0181137 A1    Jun. 15, 2023

Related U.S. Application Data

(63) Continuation of application No. PCT/CN2021/112076, filed on Aug. 11, 2021.

(30) Foreign Application Priority Data

Aug. 11, 2020 (CN) .......................... 202010801583.3
Sep. 25, 2020 (CN) .......................... 202011025780.7

(51) Int. Cl.
   *A61B 6/00*    (2024.01)

(52) U.S. Cl.
   CPC .................. *A61B 6/4441* (2013.01)

(58) Field of Classification Search
   CPC ..... A61B 6/032; A61B 6/4441; A61B 6/4452; A61B 6/588
   See application file for complete search history.

(56) References Cited

U.S. PATENT DOCUMENTS 7,591,589 B2    9/2009  Grebner et al.
2001/0005410 A1  6/2001  Rasche et al.
(Continued)

FOREIGN PATENT DOCUMENTS

CN    204108026 A    1/2015
CN    105832362 A    8/2016
(Continued)

OTHER PUBLICATIONS

International Search Report in PCT/CN2021/112076 mailed on Nov. 15, 2021, 8 pages.
(Continued)

*Primary Examiner* — Dani Fox
(74) *Attorney, Agent, or Firm* — METIS IP LLC

(57) ABSTRACT

The present disclosure provides an X-ray machine, which comprises a C-shaped arm. The C-shaped arm includes a connecting arm, a first support arm, and a second support arm. The first support arm and the second support arm are separately movably connected to the connecting arm. The first support arm moves relative to the connecting arm to move close to or away from the second support arm, and the connecting arm moves to drive the first support arm to move close to or away from the second support arm. An adjustable range of a distance between the first support arm and the second support arm is wider, so that when the radiation source is arranged on the second support arm and the detector is arranged on the first support arm, an adjustable range of a distance (SID) between the radiation source and the detector is wider.

20 Claims, 16 Drawing Sheets

(56) References Cited

U.S. PATENT DOCUMENTS

| | | | |
|---|---|---|---|
| 2009/0185662 A1* | 7/2009 | Gross | A61B 6/4441 |
| | | | 378/197 |
| 2013/0077760 A1* | 3/2013 | Tagawa | A61B 6/4291 |
| | | | 378/154 |
| 2017/0367667 A1 | 12/2017 | Hou | |
| 2019/0000407 A1* | 1/2019 | Muller | A61B 6/505 |

FOREIGN PATENT DOCUMENTS

| | | |
|---|---|---|
| CN | 205458743 A | 8/2016 |
| CN | 108013886 A | 5/2018 |
| CN | 109932374 A | 6/2019 |
| CN | 110811655 A | 2/2020 |
| CN | 110833426 A | 2/2020 |
| CN | 210056051 A | 2/2020 |
| CN | 110960245 A | 4/2020 |
| CN | 111227855 A | 6/2020 |
| CN | 111991014 A | 11/2020 |
| CN | 112043298 A | 12/2020 |
| DE | 102008032296 A1 | 1/2010 |

OTHER PUBLICATIONS

Written Opinion in PCT/CN2021/112076 mailed on Nov. 15, 2021, 9 pages.
Partial Supplementary European Search Report in European Application No. 21855573.8 mailed on Sep. 20, 2023, 10 pages.

\* cited by examiner

X-RAY MACHINES

CROSS-REFERENCE TO RELATED APPLICATIONS

This application is a continuation of International Application No. PCT/CN2021/112076, filed on Aug. 11, 2021, which claims priority of Chinese Application No. 202010801583.3, filed on Aug. 11, 2020 and Chinese Application No. 202011025780.7, filed on Sep. 25, 2020, the entire contents of which are hereby incorporated by reference.

TECHNICAL FIELD

The present disclosure relates to the technical field of a medical device, and in particular, to an X-ray machine.

BACKGROUND

With the improvement of medical treatment, the X-ray machine (XR) is commonly used, which is usually equipped with a C-shaped arm. The C-shaped arm is a C-shaped bracket that can be used to carry a device, such as a radiation source and a detector separately arranged on the C-shaped arm, which are used as a component for X-ray irradiation on the X-ray machine.

Generally, a distance between the radiation source and the detector (SID) is not adjustable, making it impossible to adjust for different patient positions and shapes, thus bringing inconvenience to the diagnosis and treatment process.

Therefore, there is an urgent need to solve the technical problem that the SID is not adjustable for a conventional X-ray machine.

SUMMARY

Based on this, the embodiments of the present disclosure provide an X-ray machine that enables an adjustable range of a distance between a radiation source and a detector (SID) wider, which brings convenience to the diagnosis and treatment process.

One embodiment of the present disclosure provides an X-ray machine. The X-ray machine comprises a C-shaped arm. The C-shaped arm includes a connecting arm, a first support arm, and a second support arm. The first support arm and the second support arm are separately movably connected to the connecting arm. The first support arm is configured to capable of moving relative to the connecting arm to move close to or away from the second support arm. The connecting arm moves to drive the first support arm to move close to or away from the second support arm.

In the above-mentioned X-ray machine, the first support arm and the second support arm of the C-shaped arm are separately movably connected to the connecting arm. The first support arm is capable of moving relative to the connecting arm to move close to or away from the second support arm. The connecting arm moves to drive the first connecting arm to move close to or away from the second support arm, causing that an adjustable range of a distance between the first support arm and the second support arm is wider, so that when the radiation source is arranged on the second support arm and the detector is arranged in the first support arm, the adjustable range of the SID is wider, which brings convenience to the diagnosis and treatment process.

In one embodiment, the first support arm is provided with a detector and the second support arm is provided with a radiation source, the detector and the radiation source are separately located on both sides of a hospital bed, the first support arm and the second support arm are separately movably connected to the connecting arm to have at least one of a first movement mode and a second movement mode.

In the first movement mode, the first support arm is configured to move relative to the connecting arm and the second support arm to cause the detector to move close to the hospital bed, and the first support arm is driven by the connecting arm to follow toward the hospital bed while the second support arm moves relative to the connecting arm to cause the radiation source to move close to the detector.

In the second movement mode, the first support arm is configured to move relative to the connecting arm and the second support arm to cause the detector to move away from the hospital bed, and the first support arm is driven by the connecting arm to follow away from the hospital bed while the second support arm moves relative to the connecting arm to cause the radiation source to move away from the detector.

In one embodiment, in the first movement mode, the first support arm is configured to move relative to the connecting arm and the second support arm to cause the detector to move close to the hospital bed, wherein the first support arm reaches a maximum travel relative to the connecting arm; or in the second movement mode, the first support arm is configured to move relative to the connecting arm and the second support arm to cause the detector to move away from the hospital bed, wherein the first support arm reaches the maximum travel relative to the connecting arm (510).

In one embodiment, the C-shaped arm (500) further includes a first drive device, a second drive device, and a third drive device. The first drive device is configured to drive the first support arm (520) to move relative to the connecting arm (510) and the second support arm (530). The second drive device is configured to drive the connecting arm (510) to move to drive the first support arm (520) to move. The third drive device is configured to drive the second support arm (530) to move relative to the connecting arm (510).

An automatic movement of the first support arm, the connecting arm, and the second support arm is realized by the setting the first drive device, the second drive device, and the third drive device.

In one embodiment, the C-shaped arm further includes a key assembly and a controller coupled to the key assembly. The controller is communicatively connected to the first drive device, the second drive device, and the third drive device, respectively. The controller is configured to control the first drive device to drive the first support arm to move, control the second drive device to drive the connecting arm to move to cause the first support arm to follow, and/or control the third drive device to drive the second support arm to move relative to the connecting arm in response to a press of the key assembly.

The setting of the key assembly facilitates an operator's control of the C-shaped arm as required.

In one embodiment, the key assembly includes a first key and/or a second key. When the first key is enabled, the controller controls the first drive device, the second drive device, and the third drive device to perform the first movement mode. When the second key is enabled, the controller controls the first drive device, the second drive device, and the third drive device to perform the second movement mode.

The setting of the first key and the second key makes the control of the C-shaped arm more flexible.

In one embodiment, the first support arm moves along a first path on the connecting arm, the second support arm moves along a second path on the connecting arm, and the first path is parallel or co-linear with the second path.

The above setting makes the transition between the first support arm moving along the first path and the second support arm moving along the second path smooth, and there is no uncomfortable connection due to a change of the center of gravity.

In one embodiment, a first sliding slot is arranged on one of the connecting arm and the first support arm, a first slider is arranged on the other of the connecting arm and the first support arm, the first slider is slidably connected to the first sliding slot, and a path of the first slider sliding along the first sliding slot is the first path.

In one embodiment, a second sliding slot is arranged on one of the connecting arm and the second support arm, a second slider is arranged on the other of the connecting arm and the second support arm, the second slider is slidably connected to the second sliding slot, and a path of the second slider sliding along the second sliding slot is the second path.

In one embodiment, the second drive device is a robot or a mechanical arm.

In one embodiment, the first support arm and the second support arm are made of carbon fiber.

The first support arm and the second support arm are made of carbon fiber material, which makes the weight of a first support arm and a second support arm light.

In one embodiment, the X-ray machine further includes a frame, and the C-shaped arm is arranged on the frame.

In one embodiment, the X-ray machine includes a digital subtraction angiography (DSA) apparatus.

In one embodiment, the X-ray machine further includes a radiation source, a detector, and a filter grid device. The radiation source is used to emit X-rays, the detector is used to receive X-rays passing through an object to be detected, and the filter grid device is arranged between the object to be detected and the detector.

In one embodiment, the filter grid device includes a housing assembly and a filter grid covered with the housing assembly. The filter grid device further includes a locking assembly and a trigger assembly. The locking assembly includes a first locking mechanism arranged on the housing assembly and a second locking mechanism arranged on the filter grid, and the first locking mechanism and the second locking mechanism are locked to each other. The trigger assembly is connected to the housing assembly and capable of driving the first locking mechanism to slide relative to the second locking mechanism to release the lock between the first locking mechanism and the second locking mechanism after being pressed.

In the above-mentioned X-ray machine, the filter grid device includes a housing assembly, a filter grid, a locking assembly, and a trigger assembly. The locking assembly includes a first locking mechanism arranged on the housing assembly and a second locking mechanism arranged on the filter grid, the first locking mechanism and the second locking mechanism are locked to each other, the trigger assembly is connected to the housing assembly and is capable of driving the first locking mechanism to slide relative to the second locking mechanism to release the lock between the first locking mechanism and the second locking mechanism after being pressed. By a trigger action of simply pressing the trigger assembly without additional tools, the housing assembly and the filter grid can be unlocked easily and quickly, making the disassembly and assembly of the housing assembly and the filter grid very convenient and saving labor and time.

In one embodiment, the trigger assembly has a gap formed between a front face of the trigger assembly and a rear face of the filter grid in a thickness direction of the filter grid device in a limit state after being pressed.

In one embodiment, the housing assembly includes a housing. The first locking mechanism and the trigger assembly are both connected to the housing. The second locking mechanism includes a second locking member, a second reset member, and an anti-release member. The second locking member and the first locking mechanism are locked to each other, the anti-release member is connected to and protruded from the second locking member by the second reset member, and the anti-release member is capable of sliding relative to the second locking member. The housing is provided with an insertion port for the extension of the second locking member, and the anti-release member is capable of being stuck against and limited to a side wall of the insertion port when releasing the lock between the second locking member and the first locking mechanism.

In one embodiment, the first locking mechanism includes a first locking member and a first reset member. The first locking member is connected to the housing by the first reset member, and the first reset member drives the second locking member and the first locking member to lock each other.

In one embodiment, the first locking member is provided with a groove, the anti-release member is capable of being clamped and limited in the groove when releasing the lock between the second locking member and the first locking member.

In one embodiment, the first locking member is provided with an accommodation groove penetrating in the thickness direction of the filter grid device, the second locking mechanism penetrates the accommodation groove, the anti-release member is capable of being stuck against and limited to a side of the first locking member relatively away from the filter grid when releasing the lock between the first locking member and the second locking member.

In one embodiment, the trigger assembly includes a trigger member and a sliding member, the sliding member is provided with a first bevel, the first locking member is provided with a second bevel against the first bevel, the trigger member is capable of being pressed and driving the sliding member to slide in a pressed direction to drive the first locking member to slide relative to the second locking member.

In one embodiment, the housing assembly further includes a first guiding mechanism, the first guiding mechanism includes a first guiding member and a first positioning member, the first positioning member is fixedly connected to the housing, one of the sliding member and the first positioning member is provided with the first guiding member and the other of the sliding member and the first positioning member is provided with a first guiding hole, and the first guiding member extends into the first guiding hole and is capable of guiding a sliding process of the trigger assembly relative to the housing.

In one embodiment, the locking assembly is located inside the housing assembly and the trigger assembly does not protrude from a front face of the filter grid.

An embodiment of the present disclosure also provides an X-ray machine. The X-ray machine comprises a filter grid device. The filter grid device includes a housing assembly and a filter grid covered with the housing assembly. The filter grid device further includes a locking assembly and a trigger assembly. The locking assembly includes a first locking mechanism arranged on the housing assembly and a second locking mechanism arranged on the filter grid, the first locking mechanism and the second locking mechanism are locked to each other. The trigger assembly is connected to the housing assembly and capable of driving the first locking mechanism to slide relative to the second locking mechanism to release the lock between the first locking mechanism and the second locking mechanism after being pressed.

In the above-mentioned X-ray machine, the filter grid device includes a housing assembly, a filter grid, a locking assembly, and a trigger assembly. The locking assembly includes a first locking mechanism arranged on the housing assembly and a second locking mechanism arranged on the filter grid, the first locking mechanism and the second locking mechanism are locked to each other, the trigger assembly is connected to the housing assembly and capable of driving the first locking mechanism to slide relative to the second locking mechanism to release the lock between the first locking mechanism and the second locking mechanism after being pressed. By a trigger action of simply pressing the trigger assembly without additional tools, the housing assembly and the filter grid can be unlocked easily and quickly, making the disassembly and assembly of the housing assembly and the filter grid very convenient, and saving labor and time.

An embodiment of the present disclosure also provides an X-ray machine. The X-ray machine comprises a frame, a radiation source, a detector, and a C-shaped arm. The C-shaped arm includes a connecting arm, a first support arm, and a second support arm. The first support arm and the second support arm are both drivable connected to the connecting arm. The C-shaped arm is arranged on the frame, the detector is arranged on the first support arm, and the radiation source is arranged on the second support arm. The X-ray machine includes at least one of a SID reduction manipulation mode and a SID increase manipulation mode as follows.

In the SID reduction manipulation mode, the first support arm is configured to move relative to the connecting arm and the second support arm to cause the detector to move close to a hospital bed, and the first support arm is driven by the connecting arm to follow toward the hospital bed and the second support arm moves relative to the connecting arm to cause the radiation source to move close to the detector.

In the SID increase manipulation mode, the first support arm is configured to move relative to the connecting arm and the second support arm to cause the detector to move away from the hospital bed, and the first support arm is driven by the connecting arm to follow away from the hospital bed and the second support arm moves relative to the connecting arm to cause the radiation source to move away from the detector.

An embodiment of the present disclosure also provides an X-ray machine. The X-ray machine comprises a frame, a radiation source, a detector, and a C-shaped arm. The C-shaped arm includes a connecting arm, a first support arm, and a second support arm. The first support arm and the second support arm are both drivable connected to the connecting arm. The C-shaped arm is arranged on the frame, the detector is arranged on the first support arm, and the radiation source is arranged on the second support arm. The X-ray machine includes at least one of a SID reduction manipulation mode and a SID increase manipulation mode.

In the SID reduction manipulation mode, a compound movement includes two movements as follows. The first support arm is configured to move toward a hospital bed relative to the connecting arm, and the second support arm is configured to move toward the hospital bed relative to the connecting arm.

In the SID increase manipulation mode, a compound movement includes two movements as follows. The first support arm is configured to move away from the hospital bed relative to the connecting arm, and the second support arm is configured to move away from the hospital bed relative to the connecting arm.

In one embodiment, in the SID reduction manipulation mode, the compound movement further includes a descending movement of the connecting arm relative to the frame; or in the SID increase manipulation mode, the compound movement further includes an ascending movement of the connecting arm relative to the frame.

In one embodiment, in the SID reduction manipulation mode, the first support arm is configured to move to a maximum travel of the first support arm toward the hospital bed relative to the connecting arm; and/or the second support arm is configured to move to the maximum travel of the second support arm toward the hospital bed relative to the connecting arm.

In one embodiment, in the SID increase manipulation mode, the first support arm is configured to move to the maximum travel of the first support arm away from the hospital bed relative to the connecting arm; and/or the second support arm (530) is configured to move to the maximum travel of the second support arm (530) away from the hospital bed relative to the connecting arm.

In one embodiment, in the SID reduction manipulation mode, the descending movement of the connecting arm relative to the frame keeps a distance between the radiation source and the hospital bed unchanged; or in the SID increase manipulation mode, the ascending movement of the connecting arm relative to the frame keeps the distance between the radiation source and the hospital bed unchanged.

In one embodiment, the frame is a robot.

In one embodiment, wherein the X-ray machine is a DSA apparatus.

DESCRIPTION OF THE DRAWING MARKERS IS AS FOLLOWS

Figure 1:
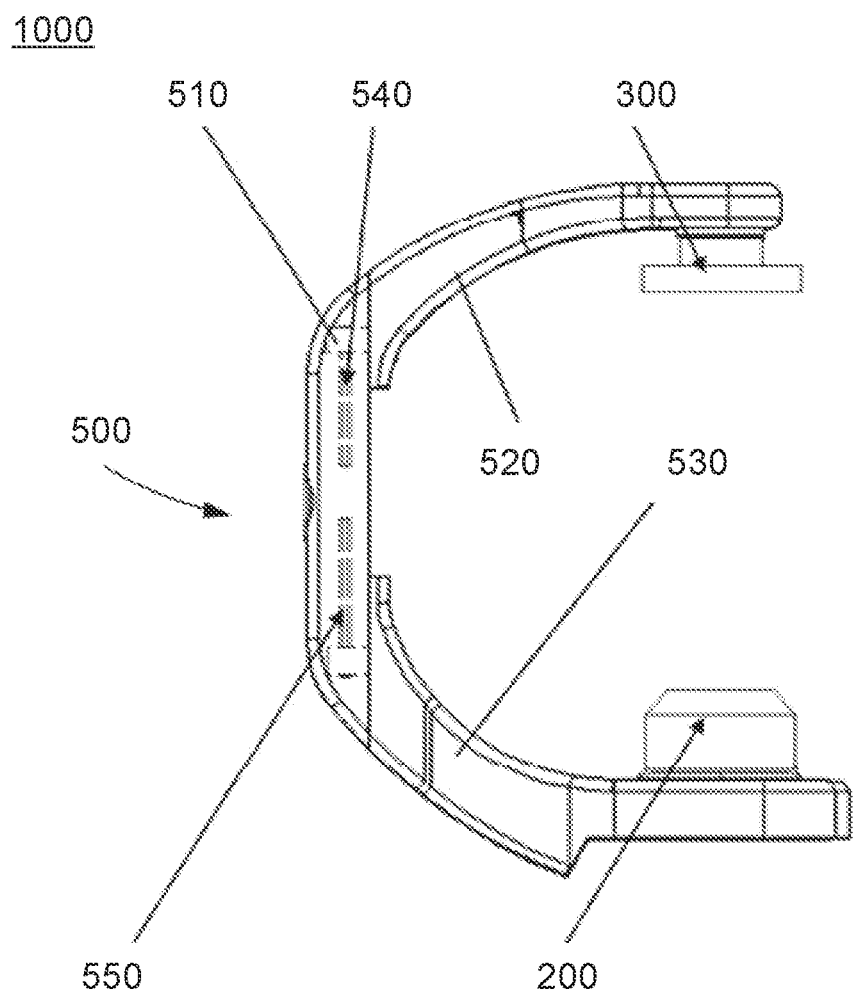
FIG. 1 is a schematic diagram illustrating a structure of an X-ray machine according to the first embodiment of the present disclosure.

1000—X-ray machine; 200—radiation source; 300—detector; 400—object to be detected.
500—C-shaped arm; 510—connecting arm; 520—first support arm; 530—second support arm; 540—first sliding slot; 550—second sliding slot; 560—mechanical arm.
100—filter grid device.
1—housing assembly; 11—housing; 111—mounting plate; 1111—insertion port; 1112—front face of the mounting plate; 1113—opening; 112—side plate; 113—mounting space; 12—first guiding mechanism; 121—first guiding member; 122—first positioning member; 1221—first guiding hole; 123—second guiding member; 1231—screw; 1232—guiding post; 13—second guiding mechanism; 131—third guiding member; 14—third guiding mechanism; 141—fourth guiding member; 142—second positioning member.
2—filter grid; 21—filter grid body; 211—body rear face; 212—body front face; 22—sealing part.
3—locking assembly; 31—first locking mechanism; 311—first locking member; 3111—groove; 3112—accommodation groove; 3113—second bevel; 3114—guiding slot; 3115—snap hook; 312—first reset member; 32—second locking mechanism; 321—second locking member; 3211—snap slot; 322—second reset member; 323—anti-release member.
4—trigger assembly; 41—trigger member; 411—front face of the trigger member; 42—sliding member;
421—first bevel; 422—second guiding hole; 423—centerline; 43—fixing member.

DETAILED DESCRIPTION

In order to make the above-mentioned objects, feature, and advantages of the present disclosure more obvious and understandable, the specific embodiments of the present disclosure are described in detail below in conjunction with the accompanying drawings. Many specific details are set forth in the following description to facilitate a full understanding of the present disclosure. However, the present disclosure can be implemented in many other ways other than those described herein, and a person skilled in the art can make similar improvements without contradicting the contents of the present disclosure, so the present disclosure is not limited by the specific embodiments disclosed below.

In the description of this present disclosure, it should be understood that the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", or the like indicate orientations or positional relationships based on those shown in the accompanying drawings and are intended only to facilitate and simplify the description of the present disclosure, do not indicate or imply that the referred device or element must have a particular orientation, be constructed and operate in a particular orientation, which cannot be interpreted as a limitation of the present disclosure.

In addition, the terms "first" and "second" are used for descriptive purposes only and are not to be construed as indicating or implying relative importance or implicitly specifying the number of technical features indicated. Thus, the features qualified with "first" and "second" may explicitly or implicitly include at least one such feature. In the description of this present disclosure, "multiple" means at least two, such as two, three, etc., unless otherwise expressly and specifically limited.

In the present disclosure, unless otherwise expressly specified and limited, the terms "mounted", "coupled", "connected", "fixed", etc. are to be understood in a broad sense, for example, which may be a fixed connection, a removable connection, or an integral part; a mechanical connection or an electrical connection; a direct connection or an indirect connection through an intermediate medium, a connection within two elements or an interaction between two elements. For a person of ordinary skill in the art, the specific meaning of the above terms in this present disclosure can be understood on a case-by-case basis.

In the present disclosure, unless otherwise expressly specified and limited, the first feature "above" or "below" the second feature may be direct contact between the first and second features, or indirect contact between the first and second features through an intermediate medium. Moreover, the first feature "above", "over" and "on" the second feature may be that the first feature is directly above or diagonally above the second feature, or simply indicate that the first feature is horizontally higher above the second feature. The first feature "under", "below", and "beneath" the second feature may be that the first feature is directly below or diagonally below the second feature, or simply indicate that the first feature is horizontally less than the second feature.

It should be noted that when an element is said to be "fixed to", "arranged on", or "set on" another element, it may be directly on the other element or there may be a centered element between the element and another element.

When an element is considered to be "connected" to another element, it can be directly connected to another element or there may be both centered elements. The terms "vertical", "horizontal", "up", "down", "left", "right" and similar expressions used herein are for illustrative purposes only, and are not meant to be the only implementation.

First Embodiment

Figure 2:
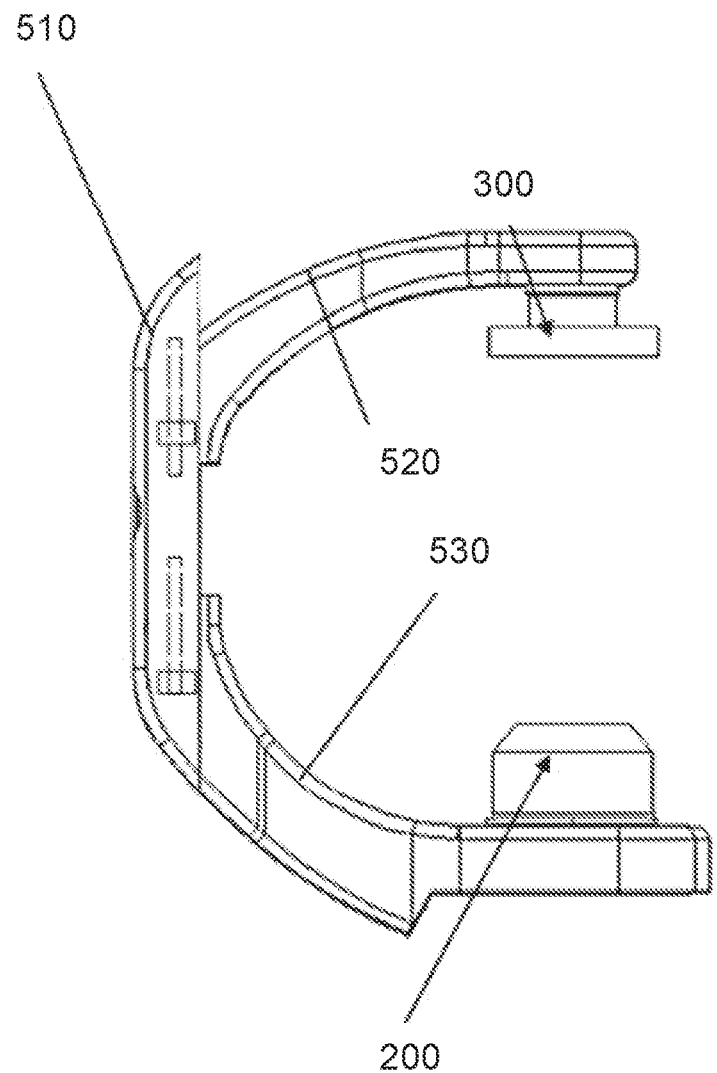
FIG. 2 is a schematic diagram illustrating a structure of a C-shaped arm in FIG. 1 when a first support arm moves relative to a connecting arm according to the first embodiment of the present disclosure.
Figure 3:
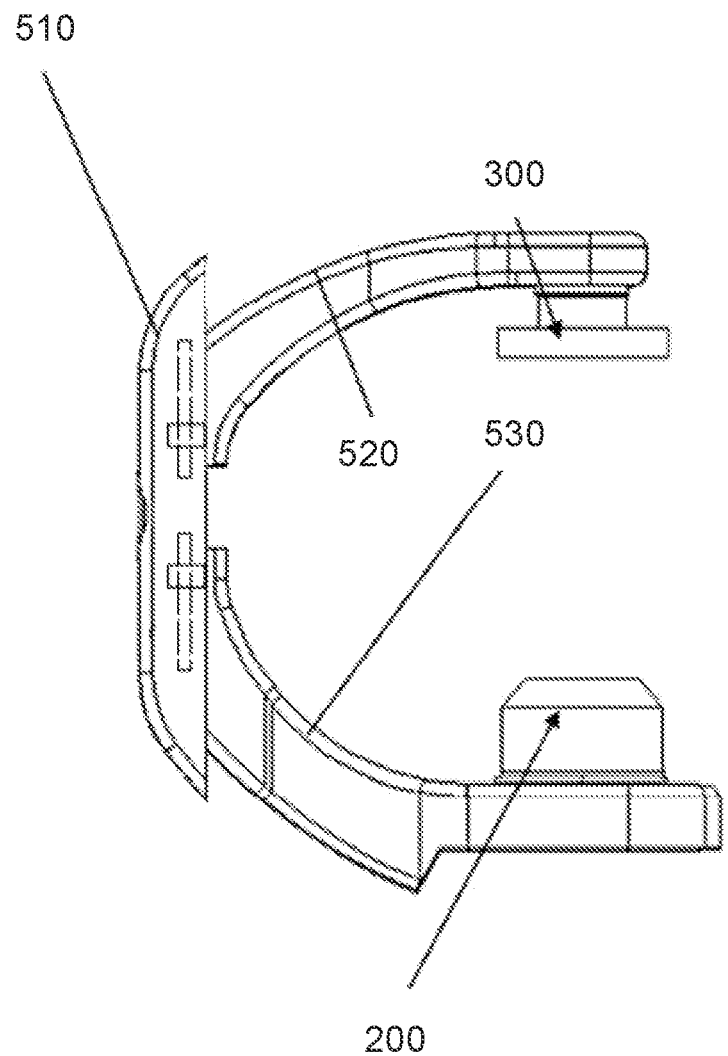
FIG. 3 is a schematic diagram illustrating a structure of the C-shaped arm in FIG. 2 when the first support arm and the connecting arm moves relative to a second support arm according to the first embodiment of the present disclosure.

As shown in FIGS. 1-3, the first embodiment of the present disclosure provides an X-ray machine 1000. The X-ray machine 1000 includes a C-shaped arm 500. The C-shaped arm 500 includes a connecting arm 510, a first support arm 520, and a second support arm 530, and a combination of the first support arm 520, the second support arm 530, and the connecting arm 510 is C-shaped. In actual use of the X-ray machine 1000, the detector 300 is arranged on the first support arm 520 and a radiation source 200 is arranged on the second support arm 530, the detector 300 and the radiation source 200 are separately arranged on both sides of a hospital bed. The detector 300 is arranged on the upper side of the hospital bed, and the radiation source 200 is arranged on a lower side of the hospital bed.

It should be noted that the radiation source 200 may be understood as a device capable of emitting X-rays, y-rays, or electron rays, etc., the detector 300 may be understood as a device capable of receiving rays emitted by the radiation source 200, and operations such as a medical examination or treatment may be achieved through a collaboration of the radiation source 200 and the detector 300.

Specifically, the first support arm 520 and the second support arm 530 are separately movably connected to the connecting arm 510, and the first support arm 520 is used to be capable of moving relative to the connecting arm 510 to move close to or away from the second support arm 530, and the connecting arm 510 moves to drive the first support arm 520 to move close to or away from the second support arm 530. The first support arm 520 and the second support arm 530 are separately movably connected to the connecting arm 510 to have at least one of a first movement mode and a second movement mode. In the first movement mode, the first support arm 520 is configured to move relative to the connecting arm 510 and the second support arm 530 to cause the detector 300 to move close to the hospital bed, the first support arm 520 is driven by the connecting arm 510 to follow toward the hospital bed while the second support arm 530 moves relative to the connecting arm 510 to cause the radiation source 200 to move close to the detector 300. In the second movement mode, the first support arm 520 is configured to move relative to the connecting arm 510 and the second support arm 530 to cause the detector 300 to move away from the hospital bed, and the first support arm 520 is driven by the connecting arm 510 to follow away from the hospital bed while the second support arm 530 moves relative to the connecting arm 510 to cause the radiation source 200 to move away from the detector 300.

Further, in the first movement mode, the first support arm 520 is configured to move relative to the connecting arm 510 and the second support arm 530 to cause the detector 300 to move close to the hospital bed, and the first support arm 520 reaches a maximum travel relative to the connecting arm 510; or in the second movement mode, the first support arm 520 is configured to move relative to the connecting arm 510 and the second support arm 530 to cause the detector 300 away from the hospital bed, and the first support arm 520 reaches the maximum travel relative to the connecting arm 510.

In order to realize automatic movements of the first support arm 520, the connecting arm 510, and the second support arm 530, the C-shaped arm 500 also includes a first drive device, a second drive device, and a third drive device. The first drive device is configured to drive the first support arm 520 to move relative to the connecting arm 510 and the second support arm 530. The second drive device is configured to drive the connecting arm 510 to move to drive the first support arm 520 and the second support arm 530 to move. The third drive device is configured to drive the second support arm 530 to move relative to the connecting arm 510.

The C-shaped arm 500 further includes a key assembly and a controller coupled to the key assembly. The controller is communicatively connected to the first drive device, the second drive device, and the third drive device, respectively. The controller is configured to control the first drive device to drive the first support arm 520 to move, control the second drive device to drive the connecting arm 510 to move to cause the first support arm 520 to follow, and/or control the third drive device to drive the second support arm 530 to move relative to the connecting arm 510 in response to a press of the key assembly.

It should be noted that the controller may be implemented by hardware, software, or a combination of software and hardware. In particular, the hardware portion may be implemented by using dedicated logic; the software portion may be stored in memory and executed by an appropriate instruction execution system, such as a microprocessor or dedicated design hardware. One of skill in the art can understand that the methods and systems described above can be implemented using computer-executable instructions and/or contained in processor control codes, such as those provided on carrier media such as hard disks, diskettes, CD or DVD-ROM, programmable memories such as read-only memory firmware, or data carriers such as optical or electronic signal carriers. The controller in this embodiment may be implemented not only by hardware circuitry such as an ultra-large scale integrated circuit or a gate array, a semiconductor such as a logic chip, a transistor, etc., or a programmable hardware device such as a field programmable gate array, a programmable logic device, etc., but also by software executed using various types of processors, and also by a combination of the above hardware circuitry and software such as firmware.

Further, the key assembly includes a first key and/or a second key. When the first key is enabled, the controller controls the first drive device, the second drive device, and the third drive device to perform the first movement mode. When the second key is enabled, the controller controls the first drive device, the second drive device, and the third drive device to perform the second movement mode. The setting of the first key and the second key facilitates operations of the user.

In some embodiments, the first drive device, the second drive device, and the third drive device may include a motor and a transmission device. In one embodiment, the motor may include a direct drive motor. The transmission device may include, but is not limited to, one or a combination of one or more of a worm gear rack transmission, a rack and pinion transmission, a screw and nut transmission, a belt transmission, and a chain transmission. The transmission device of the first drive device is connected between the motor of the first drive device and the first support arm 520, the transmission device of the second drive device is connected between the motor of the second drive device and the connecting arm 510, and the transmission device of the third drive device is connected between the motor of the third drive device and the second support arm 530. The structures of the first drive device, the second drive device, and the third drive device may be the same or different. For example, the worm gear rack transmission device may be included, or the rack and pinion transmission device may be included. As another example, the first drive device, the second drive device, and the third drive device may all include a thread nut transmission device. In some alternative embodiments, the first drive device, the second drive device, and the third drive device may include a hydraulic cylinder, a pneumatic cylinder, etc.

Figure 4:
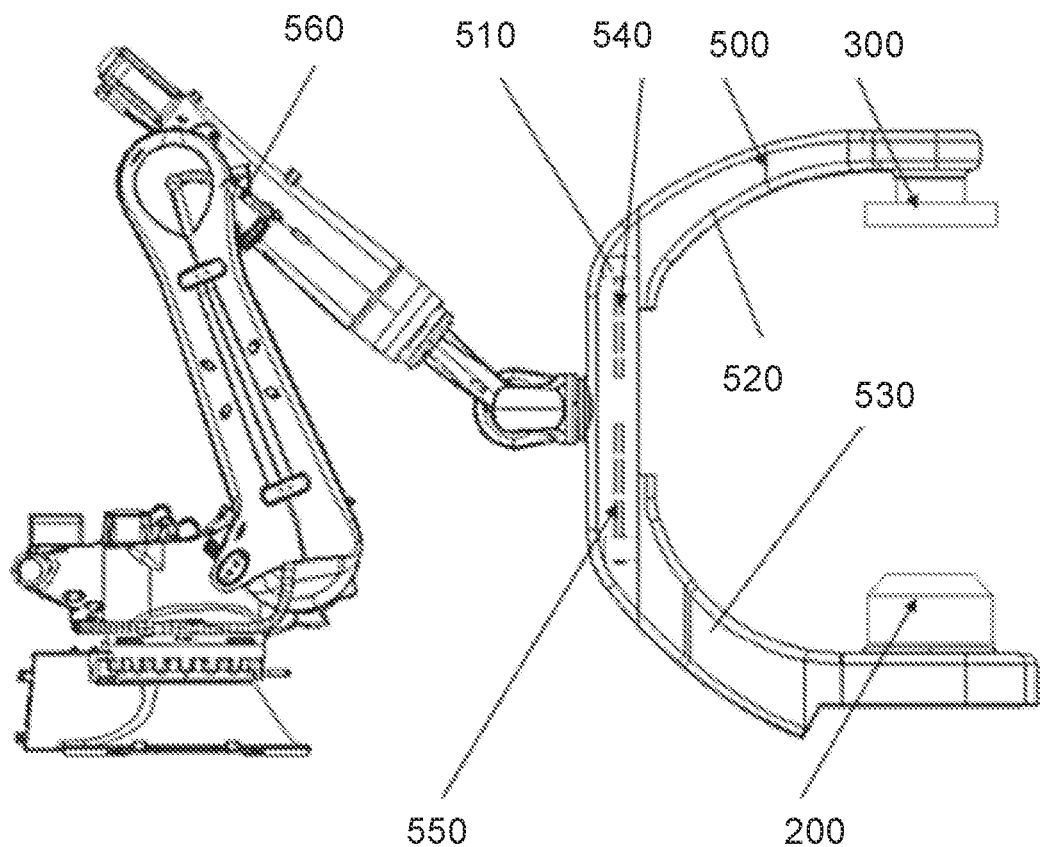
FIG. 4 is a schematic diagram illustrating a structure of a second drive device of the C-shaped arm in FIG. 1 as a mechanical arm according to the first embodiment of the present disclosure.

In some embodiments, the second drive device is a robot or a mechanical arm 560 (referring to FIG. 4), which drives the connecting arm 510 to drive the first support arm 520 to move relative to the second support arm 530 by the robot or the mechanical arm 560.

Optionally, the mechanical arm 560 is rotatably connected to the connecting arm 510, so that a rotation angle of the C-shaped arm 500 may also be adjusted by the mechanical arm 560.

In some embodiments, the first support arm 520 moves along a first path on the connecting arm 510, the second support arm 530 moves along a second path on the connecting arm 510, the first path is parallel or co-linear with the second path, and both the first path and the second path extend in a vertical direction. In this embodiment, the first path and the second path are co-linear, so that a transition between the first support arm 520 moving along the first path and the second support arm 530 moving along the second path is smooth and there is no uncomfortable connection due to a change of the center of gravity.

In some embodiments, as shown in FIG. 1, a first sliding slot 540 is arranged on the connecting arm 510, a first slider is arranged on the first support arm 520, the first slider is slidably connected to the first sliding slot 540, and a path of the first slider sliding along the first sliding slot 540 is a first path. Of course, the first sliding slot 540 may also be arranged on the first support arm 520, the first slider is arranged on the connecting arm 510, and as long as the first support arm 520 moves along the first path relative to the connecting arm 510 by a sliding collaboration of the first sliding slot 540 and the first slider.

In some embodiments, a second sliding slot 550 is arranged on the connecting arm 510, a second slider is arranged on the second support arm 530, the second slider is slidably connected to the second sliding slot 550, and a path of the second slider slides along the second sliding slot 550 is a second path. Of course, the second sliding slot 550 may also be arranged on the second support arm 530, and the second slider is arranged on the connecting arm 510, and as long as the connecting arm 510 and the second support arm 530 move along the second path by a sliding collaboration of the second sliding slot 550 and the second slider.

In this embodiment, the first sliding slot 540 is arranged on the connecting arm 510, the first slider is arranged on the first support arm 520, the second sliding slot 550 is arranged on the connecting arm 510, the second slider is arranged on the second support arm 530, both the first sliding slot 540 and the second sliding slot 550 extend along a vertical direction, and the first sliding slot 540 and the second sliding slot 550 are co-linear.

In some embodiments, the first support arm 520, the connecting arm 510, and the second support arm 530 may be provided with penetration holes for wires or cables used by the devices provided in the first support arm 520 and the second support arm 530 to pass through. On the other hand, the setting of the penetration holes may also reduce a weight of the C-shaped arm 500. On another hand, the setting of the penetration holes may also reduce the use amount of the material of the C-shaped arm 500. It should be noted that the penetration holes on the first support arm 520, the second support arm 530, and the connecting arm 510 may be set as one, or may also be set as multiple such as 2, 3, 4 or 6, etc. The multiple penetration holes may be connected to each other. The number, arrangement, size, and shape of the hollow penetration holes may be set by a person skilled in the art according to practical needs. For example, the cross-sectional shapes of the penetration holes may be a circle, a square, a polygon, or an irregular shape, etc. Such variations are still within the scope of protection of the present disclosure.

In some embodiments, reinforcement bars may be arranged in both the first support arm 520 and the second support arm 530. The reinforcement bars may further improve a structural strength of the first support arm 520 and the second support arm 530 without increasing a wall thickness of the first support arm 520 and the second support arm 530, so as to avoid deformation of the first support arm 520 and the second support arm 530 under force, so that the first support arm 520 and the second support arm 530 can better support a device set thereon. It should be noted that the reinforcement bars may be set in shape of strips or grids, etc. The technical person in the field can specifically design the shape of the reinforcement bars according to the needs, and the present disclosure does not limit this.

In some embodiments, to further enhance the structural strength of the C-shaped arm 500, the reinforcement bars may also be arranged in the connecting arm 510. In other embodiments, the reinforcement bars may be arranged on an outer surface of the first support arm 520, the second support arm 530, and/or the connecting arm 510 of the C-shaped arm 500. The purpose of the arrangement of the reinforcement bars is mainly to improve the overall stiffness of the C-shaped arm 500, so the person skilled in the art can also set the reinforcement bars to other positions according to the practical needs, or the number of the reinforcement bars can be reasonably increased or reduced according to the needs. In the above embodiment, the reinforcement bars may also be other reinforcing stiffness structures, such as reinforcing plates, reinforcing ribs, etc. Similar such transformations are still within the scope of protection of the present disclosure.

In some embodiments, the material of both the first support arm 520 and the second support arm 530 may be set as carbon fiber. For example, the first support arm 520 and the second support arm 530 may be integrally formed by carbon fiber, making the weight of the first support arm 520 and the second support arm 530 light.

Alternatively, the material of the connecting arm 510 may be set as carbon fiber. In alternative embodiments, the connecting arm 510, the first support arm 520, and the second support arm 530 may also be spliced by sheet metal parts or castings.

The adjustable mode of the C-shaped arm 500 in this embodiment can give full play to the structural advantage of the C-shaped arm 500 without changing the operating habits of the operator, and can obtain a larger surgical space and angle-forming range, as well as reduce the radiation dose.

In use, when the detector 300 is in an orientation in FIG. 1, the first key is enabled to cause the detector 300 close to the hospital bed.

Specifically, when the first support arm 520 reaches a maximum travel downward relative to the connecting arm 510, the first key is continued to be enabled, the controller controls the second drive device to drive the connecting arm 510 to move, and the first support arm 520 is driven by the connecting arm 510 to follow toward the hospital bed, while the third drive device drives the second support arm 530 to move relative to the connecting arm 510 to cause the radiation source 200 close to the detector 300.

In use, when the detector 300 is in an orientation such in FIG. 1, the second key is enabled and the first support arm 520 moves relative to the connecting arm 510 and the second support arm 530 to move to cause the detector 300 away from the hospital bed.

Specifically, when the first support arm 520 reaches the maximum travel of the connecting arm 510, the second key is continued to be enabled, the controller controls the second drive device to drive the connecting arm 510 to move, and the first support arm 520 driven by the connecting arm 510 drives the detector 300 to move away from the hospital bed, while the third drive device drives the second support arm 530 to move relative to the connecting arm 510 to cause the radiation source 200 to move away from the detector 300 or the hospital bed.

In some embodiments, the X-ray machine 1000 further includes a frame. Specifically, the mechanical arm 560 is mounted on the frame, and the actuation of the mechanical arm 560 facilitates an adjustment of a position of the detector 300 in the process of X-rays photography of the patient using the X-ray machine, which facilitates a more accurate positioning of a part of the patient to be photographed or treated. More specifically, in a manipulation mode, the purpose of reducing the SID is achieved by adjusting the first support arm 510 downward relative to the hospital bed and relative to the connecting arm 510, and then adjusting the connecting arm 510 downward relative to the frame while adjusting the radiation source 200 upward relative to the connecting arm 510. In this manipulation mode, a height of the radiation source 200 from the ground (or a distance from the hospital bed) is essentially constant. Alternatively, the SID is increased by adjusting the first support arm 520 upward relative to the hospital bed and relative to the connecting arm 510, and then adjusting the connecting arm 510 upward relative to the frame while adjusting the radiation source 200 downward relative to the connecting arm 510. In this manipulation mode, the height of the radiation source 200 from the ground (or the distance from the hospital bed) is essentially constant. In both manipulation modes, although a movement mode increases the movement of the connecting arm 510 and the movement of the second support arm 530 relative to the connecting arm 510, the operating habits are consistent with those of a physician operating this type of device, i.e., the distance between the radiation source 200, which is located below the hospital bed, and the hospital bed remains essentially constant during the SID adjustment process, and the detector 300 rises or falls relative to the hospital bed from the perspective of the patients' vision, that is, the patients is aware of the SID becoming larger or smaller.

The X-ray machine 1000 is capable of making the distance between the radiation source 200 and the detector 300 larger or smaller by the aforementioned different manipulation modes during the examination of the patient by setting the C-shaped arm 500 as described above, making it easier for the operator to perform the X-ray examination of the patient. Moreover, the variation range of the SID of the present disclosure is greater than that of the conventional X-ray machine.

In some embodiments, the X-ray machine may include a digital subtraction angiography (DSA) apparatus. The DSA apparatus is an X-ray machine that combines a conventional angiography and an electronic computer image processing technology, which can make the display of blood vessels and their lesions more clearly and have a high application value.

An embodiment of the present disclosure also provides an X-ray machine. The X-ray machine comprises a frame, a radiation source 200, a detector 300, and a C-shaped arm 500. The C-shaped arm 500 includes a connecting arm 510, a first support arm 520, and a second support arm 530. The first support arm 520 and the second support arm 530 are both drivable connected to the connecting arm 510. The C-shaped arm 500 is arranged on the frame, the detector 300 is arranged on the first support arm 520, and the radiation source 200 is arranged on the second support arm 530. The X-ray machine includes at least one of a SID reduction manipulation mode and a SID increase manipulation mode as follows.

In the SID reduction manipulation mode, the first support arm 520 is configured to move relative to the connecting arm 510 and the second support arm 530 to cause the detector 300 to move close to a hospital bed, and the first support arm 520 is driven by the connecting arm 510 to follow toward the hospital bed and the second support arm 530 moves relative to the connecting arm 510 to cause the radiation source 200 to move close to the detector 300.

In the SID increase manipulation mode, the first support arm 520 is configured to move relative to the connecting arm 510 and the second support arm 530 to cause the detector 300 to move away from the hospital bed, and the first support arm 520 is driven by the connecting arm 510 to follow away from the hospital bed and the second support arm 530 moves relative to the connecting arm 510 to cause the radiation source 200 to move away from the detector 300.

An embodiment of the present disclosure also provides an X-ray machine. The X-ray machine comprises a frame, a radiation source (200), a detector (300), and a C-shaped arm (500). The C-shaped arm (500) includes a connecting arm (510), a first support arm (520), and a second support arm (530). The first support arm (520) and the second support arm (530) are both drivable connected to the connecting arm (510). The C-shaped arm (500) is arranged on the frame, the detector (300) is arranged on the first support arm (520), and the radiation source (200) is arranged on the second support arm (530). The X-ray machine includes at least one of a SID reduction manipulation mode and a SID increase manipulation mode as follows.

In the SID reduction manipulation mode, a compound movement includes two movements as follows. The first support arm 520 is configured to move toward a hospital bed relative to the connecting arm 510, and the second support arm 530 is configured to move toward the hospital bed relative to the connecting arm 510.

In the SID increase manipulation mode, a compound movement includes two movements as follows. The first support arm 520 is configured to move away from the hospital bed relative to the connecting arm 510, and the second support arm 530 is configured to move away from the hospital bed relative to the connecting arm 510. The X-ray machine is a DSA apparatus and the frame is a robot.

In the SID reduction manipulation mode, the compound movement further includes a descending movement of the connecting arm 510 relative to the frame; or in the SID increase manipulation mode, the compound movement further includes an ascending movement of the connecting arm 510 relative to the frame. In the SID reduction manipulation mode, the first support arm 520 moves to a maximum travel of the first support arm 520 toward the hospital bed relative to the connecting arm 510; and/or the second support arm 530 moves to the maximum travel of the second support arm 530 toward the hospital bed relative to the connecting arm 510.

In the SID increase manipulation mode, the first support arm 520 moves to the maximum travel of the first support arm 520 away from the hospital bed relative to the connecting arm 510; and/or the second support arm 530 moves to the maximum travel of the second support arm 530 away from the hospital bed relative to the connecting arm 510.

In the SID reduction manipulation mode, the descending movement of the connecting arm 510 relative to the frame keeps a distance between the radiation source 200 and the hospital bed unchanged; or in the SID increase manipulation mode, the ascending movement of the connecting arm 510 relative to the frame keeps the distance between the radiation source 200 and the hospital bed unchanged.

Second Embodiment

Figure 5:
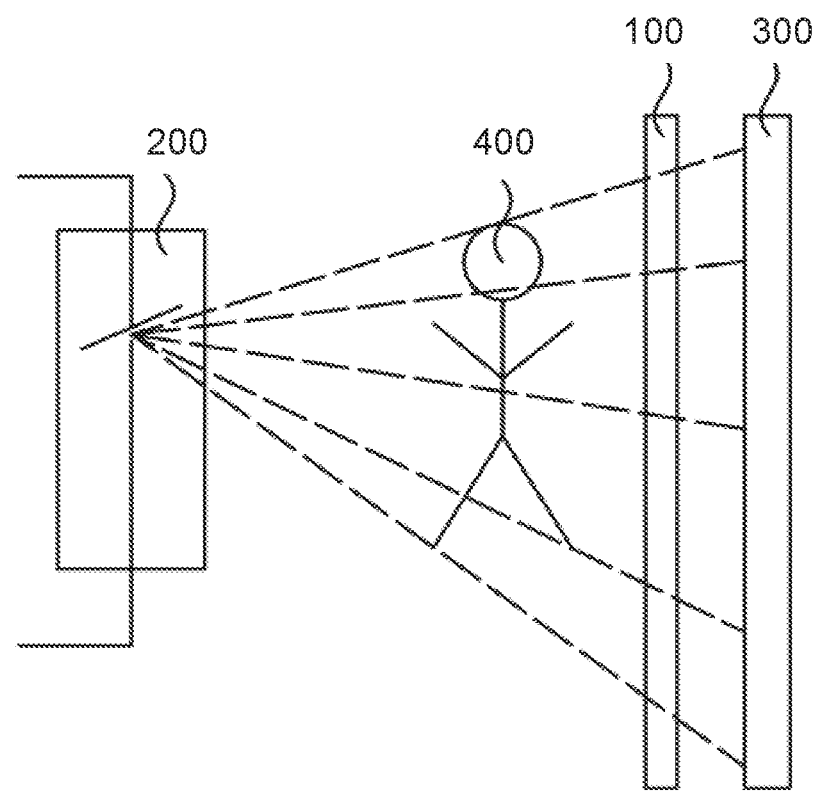
FIG. 5 is a schematic diagram illustrating a structure of an X-ray machine according to the second embodiment of the present disclosure.

As shown in FIG. 5, the X-ray machine provided in the second embodiment of the present disclosure has basically the same structure as the X-ray machine provided in the first embodiment, the main difference is that the X-ray machine provided in the second embodiment also includes a radiation source 200, a detector 300, and a filter grid device 100, based on the first embodiment. The radiation source 200 and the detector 300 are spaced and set facing each other, and an object 400 to be detected is located between the radiation source 200 and the detector 300. The X-ray source 200 is used to emit X-rays, and the detector 300 is used to receive X-rays passing through the object 400 to be detected. Because the X-rays have a certain penetration ability, and the tissue structure of the object 400 to be detected has different density and thickness, so the X-rays have different penetration ability corresponding to different locations of the object 400 to be detected, and the remaining X-rays forms an X-ray image on the detector 300 through an imaging process. When the primary rays emitted from the radiation source 200 irradiate the object 400 to be detected, many scattered rays in different directions are generated, which blur an image as a whole and affect the contrast of the image. In order to reduce the effect of the scattered rays on the image quality, the filter grid device 100 is arranged between the object 400 to be detected and the detector 300, and the image becomes very clear after using the filter grid device 100.

Figure 6:
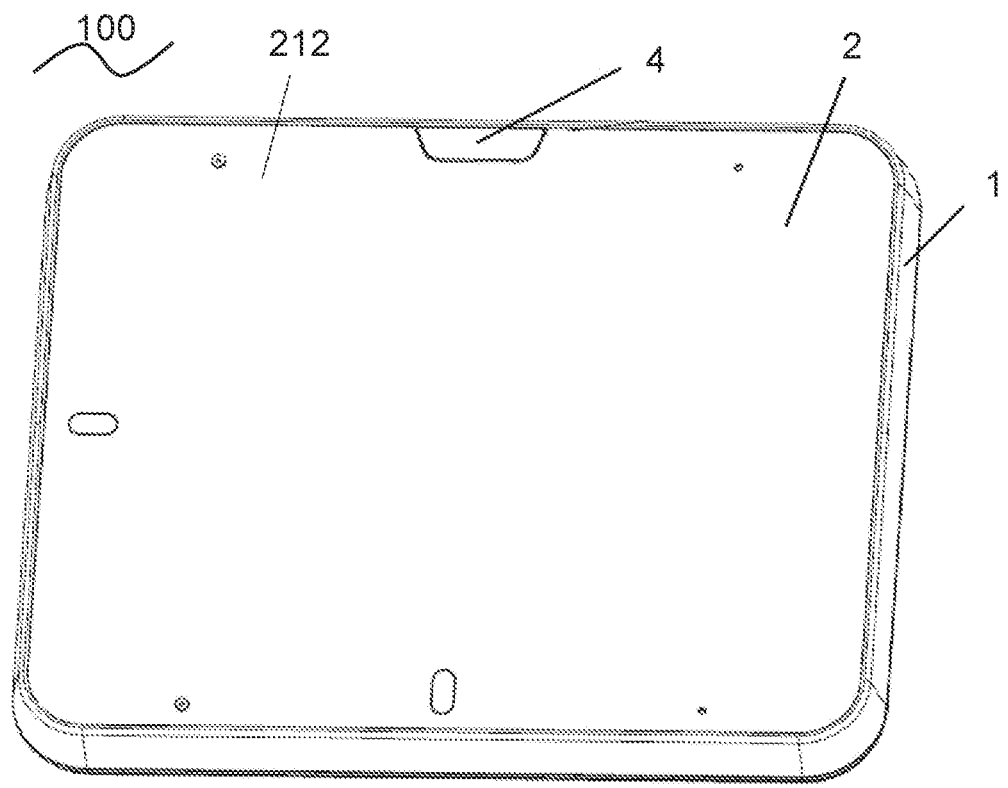
FIG. 6 is a schematic diagram illustrating a structure of a front of a filter grid device in FIG. 5 according to the second embodiment of the present disclosure.

The structure of the filter grid device 100 is briefly introduced in conjunction with FIG. 6. As shown in FIG. 6, the filter grid device 100 includes a housing assembly 1 and a filter grid 2 covered with the housing assembly 1, and the filter grid 2 is detachably connected to the housing assembly 1, so as to achieve the replacement of different models or different service life of the filter grid 2. A conventional filter grid 2 is connected to the housing assembly 1 by screws, and the operator needs to use a tool such as a screwdriver to disassembly and assembly the screws, which makes the disassemble and assembly of the filter grid 2 and the housing assembly 1 very inconvenient.

Figure 7:
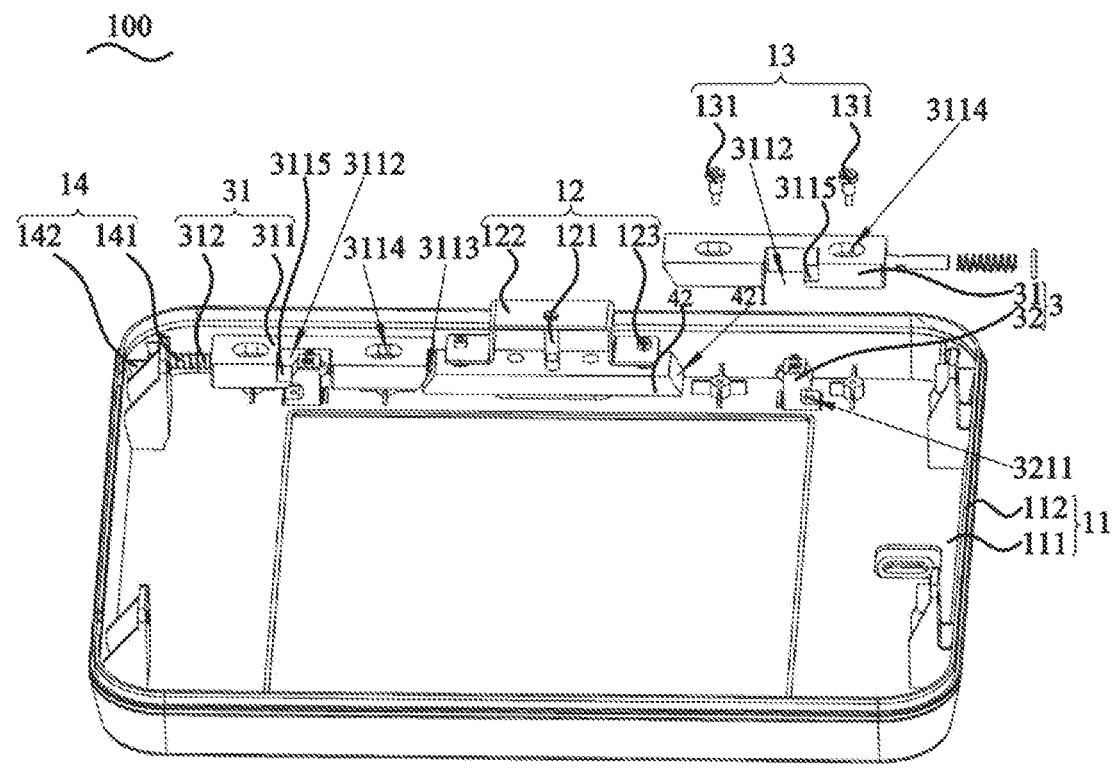
FIG. 7 is a schematic diagram illustrating a structure of a back of the filter grid device in FIG. 5 according to the second embodiment of the present disclosure.

In order to solve the above problems, as shown in FIGS. 6 and 7, the filter grid device 100 of this embodiment also includes a locking assembly 3 and a trigger assembly 4, the locking assembly 3 includes a first locking mechanism 31 arranged on the housing assembly 1 and a second locking mechanism 32 arranged on the filter grid 2, the first locking mechanism 31 and the second locking mechanism 32 are locked to each other, the trigger assembly 4 is connected to the housing assembly 1 and is capable of driving the first locking mechanism 31 to slide relative to the second locking mechanism 32 to release the lock between the first locking mechanism 31 and the second locking mechanism 32 after being pressed. By a trigger action of simply pressing the trigger assembly without additional tools, the housing assembly 1 and the filter grid 2 can be unlocked easily and quickly, making the disassembly and assembly of the housing assembly and the filter grid very convenient and saving labor and time. By using the above structure of the filter grid device 100, the X-ray machine can be quickly disassembled and assembled, saving labor and time.

Figure 8:
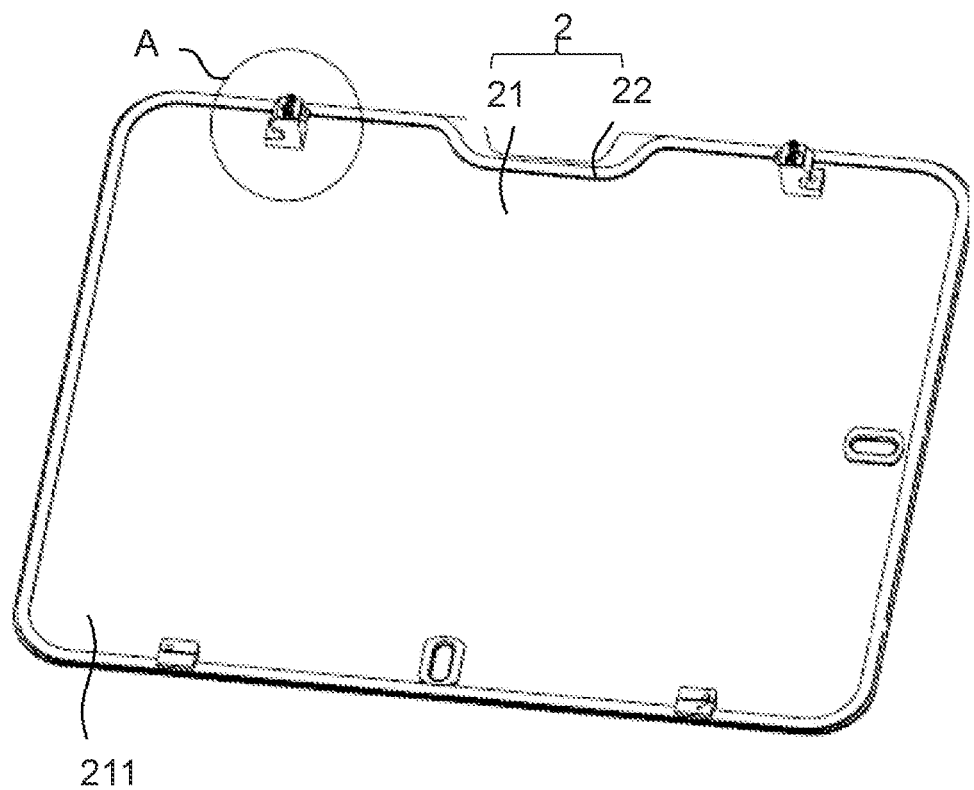
FIG. 8 is a schematic diagram illustrating a structure of the filter grid in FIG. 6 according to the second embodiment of the present disclosure.
Figure 9:
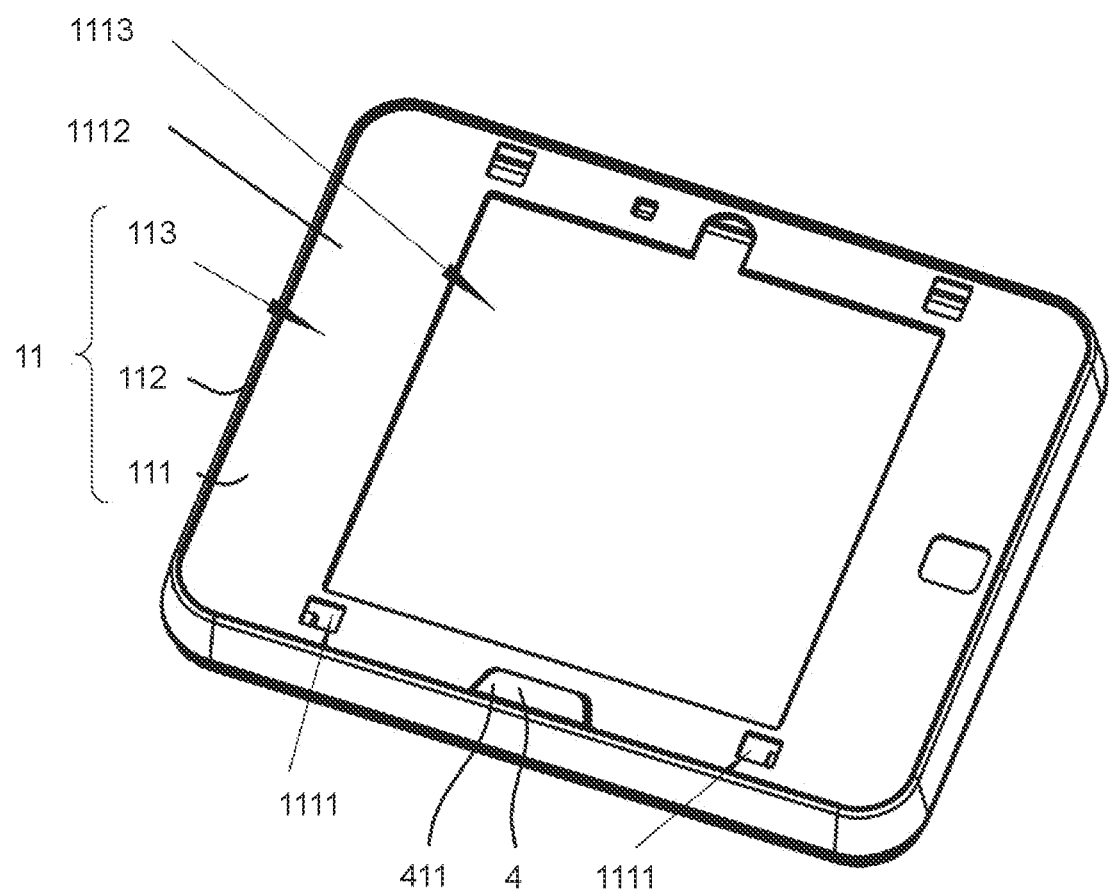
FIG. 9 is a schematic diagram illustrating a structure of a front of a housing in FIG. 7 according to the second embodiment of the present disclosure.

The structure of the housing assembly 1 and the filter grid 2 is briefly described in conjunction with FIGS. 6, 8, and 9. As shown in FIGS. 6 and 8, the filter grid 2 includes a filter grid body 21 and a sealing part 22, the filter grid body 21 is plate-shaped and includes a body front face 212 and a body rear face 211, the sealing part 22 is an annular sealing strip, the sealing part 22 is arranged on the body rear face 211, the sealing part 22 is arranged along an outer contour line of the filter grid 2. When the filter grid 2 is mounted on the housing assembly 1, the filter grid body 21 and the housing assembly 1 jointly clamp the sealing part 22, the sealing part 22 is capable of sealing the filter grid device 100, which can prevent X-rays from passing backwards through a gap between the filter grid body 21 and the housing assembly 1 and ensure that the X-rays all pass through the filter grid body 21 and the scattered rays are eliminated, thus enabling the image on the detector 300 to achieve maximum clarity. Specifically, the sealing part 22 may be a ring-shaped sponge foam, which can avoid a hard contact between the filter grid 2 and the housing assembly 1, avoid damage to the filter grid 2 and the housing assembly 1 due to a soft texture of the sponge foam, so as to improve the service life of the filter grid 2 and the housing assembly 1.

As shown in FIG. 9, the housing 11 includes a mounting plate 111 and a side plate 112, and the periphery of the mounting plate 111 extends forward or backward to form the side plate 112, and the side plate 112 and a front surface 1112 of the mounting plate 111 forms a mounting space 113, and the filter grid 2 is arranged in the mounting space 113. In order to achieve a quick positioning and mounting of the filter grid 2 and the housing 11 and improve the mounting efficiency of the filter grid 2 and the housing 11, a size and shape of an inner periphery of the side plate 112 is the same as a size and shape of an outer periphery of the filter grid body 21 as shown in FIGS. 8 and 9. In addition, in order to achieve the effect of conducting the X-rays from a front of the filter grid device 100 backward, the mounting plate 111 is also provided with an opening 1113, and when the filter grid 2 is mounted on the mounting plate 111, the filter grid 2 covers the opening 1113 completely, and the X-rays from the front of the filter grid device 100 can pass backward through the filter grid 2 and the opening 1113.

Since the sealing part 22 has a certain thickness, there is a certain gap between the body rear face 211 and the front face 1112 of the mounting plate along a front-to-back direction (a thickness direction of the filter grid device 100). In a limit state after the trigger assembly 4 of this embodiment is pressed, the front face 411 of the trigger member of the trigger assembly 4 and the body rear face 211 forms a gap along the front-to-back direction, which is convenient for the operator to insert his hand into the gap to exert force on the filter grid 2, so as to achieve the effect of detaching the filter grid 2 from the housing assembly 1. By applying the filter grid device 100 provided in this embodiment, the operator presses the trigger assembly 4 with one hand and exerts force on the filter grid 2 with the other hand to detach the filter grid 2 from the housing assembly 1, the whole detaching action is done in one go and very smooth, which is convenient for the operator to operate and can effectively improve the disassembly and assembly efficiency of the housing assembly 1 and the filter grid 2.

In addition, the existing technology applies screws to lock the filter grid 2 and the housing assembly 1, and the head of the screws may protrude from an outer surface of the filter grid device 100, and the head of the screws may scratch other parts during the use of the X-ray machine, thus affecting the experience of using the X-ray machine. In order to solve the above problem, as shown in FIG. 6, when the filter grid device 100 is locked, the trigger assembly 4 is set as not protruding from the body front surface 212, which can prevent the locking assembly 3 and the trigger assembly 4 from scratching other parts, ensuring a better experience of using the X-ray machine and making the filter grid device 100 more elegant.

As a preferred scheme to the above scheme, as shown in FIG. 7, the locking assembly 3 in this embodiment is located in an accommodation space formed by the housing assembly 1 and the filter grid 2, and the housing assembly 1 and the filter grid 2 jointly play a role in shielding the locking assembly 3 to avoid a leakage of the locking assembly 3, making the appearance of the filter grid device 100 simple and elegant. In addition, it can also avoid the problem that the assembly of the housing assembly 1 and the filter grid 2 is not tight due to the operator accidentally touching the locking assembly 3, so that the housing assembly 1 and the filter grid 2 lock tighter, ensuring the normal and safe use of the assembled filter grid device 100.

Figure 10:
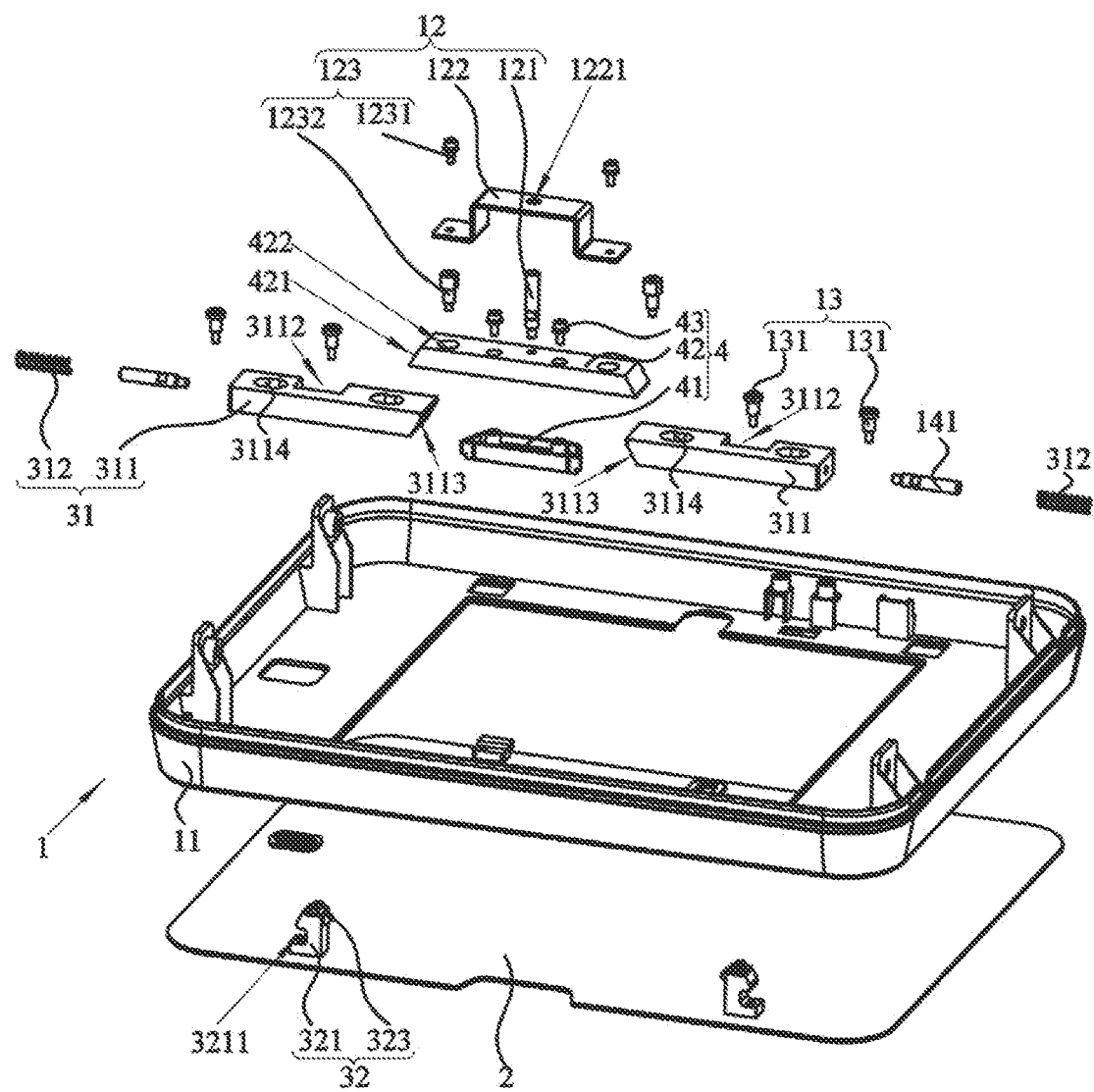
FIG. 10 is an exploded diagram illustrating the filter grid device in FIG. 5 according to the second embodiment of the present disclosure.

In order to realize an automatic locking of the first locking mechanism 31 and the second locking mechanism 32 and reduce the difficulty of locking the filter grid 2 in the housing assembly 1, it is explained in conjunction with FIGS. 7 and 10. As shown in FIGS. 7 and 10, the first locking mechanism 31 includes a first locking member 311 and a first reset member 312, and the second locking mechanism 32 includes a second locking member 321, the first locking member 311 is connected to the housing 11 through the first reset member 312, the first locking mechanism 31 is connected to the housing 11, and the first reset member 312 drives the second locking member 321 and the first locking member 311 to lock each other.

In order to achieve the locking of the first locking member 311 and the second locking member 321, specifically, as shown in FIG. 7, the first locking member 311 is provided with a snap hook 3115, the second locking member 321 is opened with a snap slot 3211, and the first reset member 312 is a spring. When the filter grid 2 is mounted on the housing assembly 1, the spring drives the second locking member 321 to move to achieve the effect that the snap hook 3115 arranged on the first locking member 311 automatically stuck in the snap slot 3211 on the second locking member 321, so as to achieve the automatic locking of the first locking member 311 and the second locking member 321. In addition, since the spring can provide a large elastic restoring force, a tight locking of the snap hook 3115 and the snap slot 3211 is realized, the snap hook 3115 can be effectively prevented from loosening from the snap slot 3211, ensuring a tight locking of the filter grid 2 and the housing assembly 1 and a long time during normal use of the filter grid device 100. Of course, in other embodiments, the snap hook 3115 may also be arranged on the second locking mechanism 32 and the snap slot 321 may be opened on the first locking mechanism 31, which can also achieve the above effect.

Figure 11:
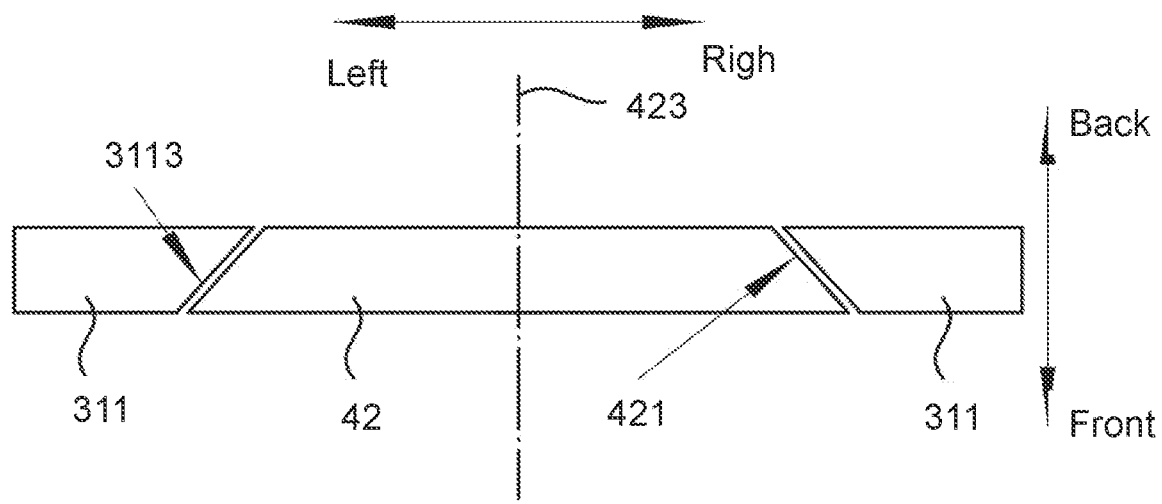
FIG. 11 is a schematic diagram illustrating structures of a sliding member and a first locking member in FIG. 10 according to the second embodiment of the present disclosure.

In order to realize the unlocking of the first locking mechanism 31 and the second locking mechanism 32, as shown in FIGS. 7, 10, and 11, the trigger assembly 4 includes a trigger member 41, a sliding member 42, and a fixed member 43 connected to each other, the trigger member 41 and the sliding member 42 are arranged along a front to back direction, and the trigger member 41 and the sliding member 42 are fixedly connected by the fixed member 43. The sliding member 42 is provided with a first bevel 421, the first locking member 311 is provided with a second bevel 3113 against the first bevel 421, and the trigger member 41 may be pressed and drive the sliding member 42 to slide in a pressing direction (rearward direction in FIG. 7) to drive the first locking member 311 to slide relative to the second locking member 321, so as to realize the unlocking of the first locking mechanism 31 and the second locking mechanism 32. Specifically, the first bevel 421 and the second bevel 3113 are inclined toward a centerline 423 of the trigger assembly 4 from front to back, and the movement of the trigger assembly 4 along the front-to-back direction may be converted into the movement of the first locking member 311 along a left-to-right direction by the setting of the first bevel 421 and the second bevel 3113.

In order to ensure that the trigger assembly 4 is not deflected during the pressing process, as shown in FIGS. 7 and 10, the housing assembly 1 also includes a first guiding mechanism 12, the first guiding mechanism 12 includes a first guiding member 121 and a first positioning member 122, the first positioning member 122 is fixedly connected to the housing 11, one of the sliding member 42 and the first positioning member 122 is provided with the first guiding member 121, and the other of the sliding member 42 and the first positioning member 122 is provided with a first guiding hole 1221. The first guiding member 121 extends into the first guiding hole 1221 and is capable of guiding a sliding process of the trigger assembly 4 relative to the housing 11.

Specifically, the first guiding member 121 is a guiding rod fixed to the sliding member 42 extending in a front-back direction, and the guiding hole 1221 is opened on the first positioning member 122, and the guiding rod is inserted in the guiding hole 1221 and is capable of sliding relative to the guiding hole 1221. The guiding rod and the guiding hole 1221 may be a clearance fit to ensure a smooth sliding of the guiding rod in the guiding hole 1221, and the guiding rod is capable of guiding the sliding process of the trigger assembly 4 relative to the housing 11.

In order to further ensure that the trigger assembly 4 is not deflected during the pressing process, as shown in FIGS. 7 and 10, the first guiding member 121 also includes a second guiding member 123, the second guiding member 123 includes a screw 1231 and a guiding post 1232, the guiding post 1232 is fixed to the first positioning member 122 by the screw 1231, a second guiding hole 422 is opened on the sliding member 42, and the guiding post 1232 extends in a front-to-back direction and is inserted in the second guiding hole 422.

In order to ensure that the first locking member 311 is not deflected during the sliding process in the left-right direction, as shown in FIGS. 7 and 10, the housing assembly 1 also includes a second guiding mechanism 13, and the second guiding mechanism 13 includes a third guiding member 131 connected to the housing 11, and the first locking member 311 is provided with a guiding slot 3114 extending in a left-to-right direction, and a third guiding member 131 is inserted in the guiding slot 3114 and is capable of sliding along the guiding slot 3114, so as to achieve the guiding effect on the sliding of the first locking member 311.

When the first locking member 311 is sliding along the left-to-right direction, the first reset member 312 may be bent, resulting in failure to extend or be pressed along the left-to-right direction. In order to solve the above problem, as shown in FIGS. 7 and 10, the housing assembly 1 also includes a third guiding mechanism 14, the third guiding mechanism 14 includes a fourth guiding member 141 and a second positioning member 142, the second positioning member 142 is arranged on one side of the first locking member 311, the second positioning member 142 is provided with a fourth guiding hole 1421, the first locking member 311 extends toward a side of the second positioning member 142 to form a rod-shaped fourth guiding member 141, and the fourth guiding member 141 is inserted in the fourth guiding hole 1421 to guide the sliding process of the first locking member 311 relative to the housing 11. The first reset member 312 is a spring, and the spring is sleeved on an outer periphery of the fourth guiding member 141, one end of the spring is against to the second positioning member 142, and the other end of the spring is against to the first locking member 311, so as to ensure that the spring extends or is pressed along the left-to-right direction to avoid the bending of the spring.

Figure 12:
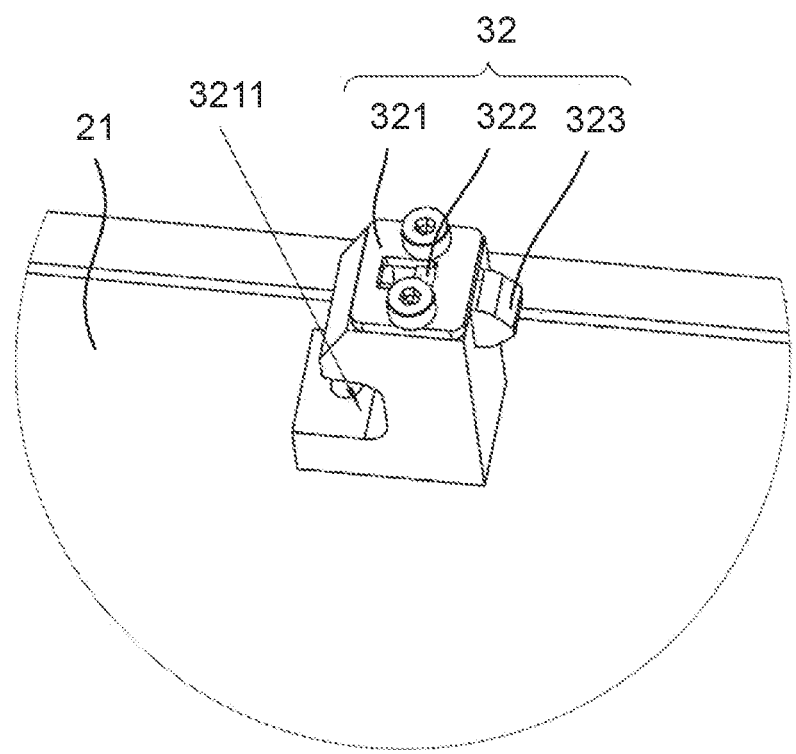
FIG. 12 is a partial enlarged diagram at position A in FIG. 8 according to the second embodiment of the present disclosure.

In addition, when the filter grid device 100 is mounted on the X-ray machine, the outer surface of the filter grid 2 is often facing downward or the filter grid device 100 is set vertically. When the operator detaches the filter grid 2 of the filter grid device 100 in the above state, the filter grid 2 is prone to fall due to gravity, and the falling filter grid 2 may hit the operator, thus affecting the operator's personal safety. In order to solve the above problem, as shown in FIGS. 7 and 12, the second locking mechanism 32 also includes a second reset member 322 and an anti-release member 323, the anti-release member 323 is connected to and protruded from the second locking member 321 by the second reset member 322, the anti-release member 323 is capable of sliding relative to the second locking member 321, and the housing 11 is provided with an insertion port 1111 for extension of the second locking member 321. The anti-release member 323 is capable of being stuck against and limited to a side wall of the insertion port 1111 when the second locking member 321 is unlocked with the first locking mechanism 31, the anti-release member 323 may interfere with the housing 11 so that the filter grid 2 cannot be directly detached from the housing assembly 1, and the operator needs to drag hard to overcome the resistance of the housing 11 to the anti-release member 323. The operator can take out the filter grid 2 from the housing 11, which can prevent the filter grid 2 from falling and avoid the filter grid 2 from hitting the operator, thus ensuring the operator's personal safety.

The disassembly and assembly of the filter grid device 100 is described in connection with FIGS. 7-9 and 11.

When it is necessary to mount the filter grid 2 to the housing assembly 1, as shown in FIGS. 7-9, the second locking member 321 is aligned with its corresponding insertion port 1111, the second locking member 321 extends into a back of the housing 11, the second locking member 321 pushes the corresponding first locking member 311 to move outward in the left-to-right direction. When the snap hook 3115 is aligned with the snap slot 3211, the first reset member 312 pushes the first locking member 311 to move inward in the left-to -right direction to make the snap hook 3115 snap into the snap slot 321, so that the filter grid 2 may be locked with the housing assembly 1. When it is necessary to detach the filter grid 2 from the housing assembly 1, as shown in FIGS. 7, 8, and 11, the operator presses the trigger assembly 4 backward along the thickness direction of the filter grid device 100, the sliding member 42 causes the first locking member 311 to move outward in a horizontal direction so that the snap hook 3115 is separated from the snap slot 321, and the operator inserts his hand into the gap to exsert force on the filter grid 2, so as to detach the filter grid 2 from the housing assembly 1

Third Embodiment

Figure 13:
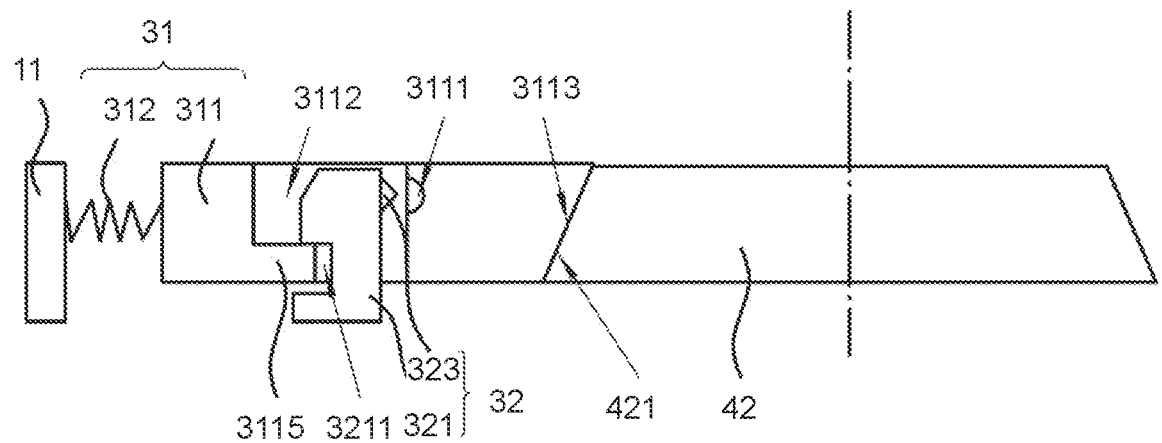
FIG. 13 is a schematic diagram illustrating structures of a first locking member and a second locking member in a locked state according to the third embodiment of the present disclosure.
Figure 14:
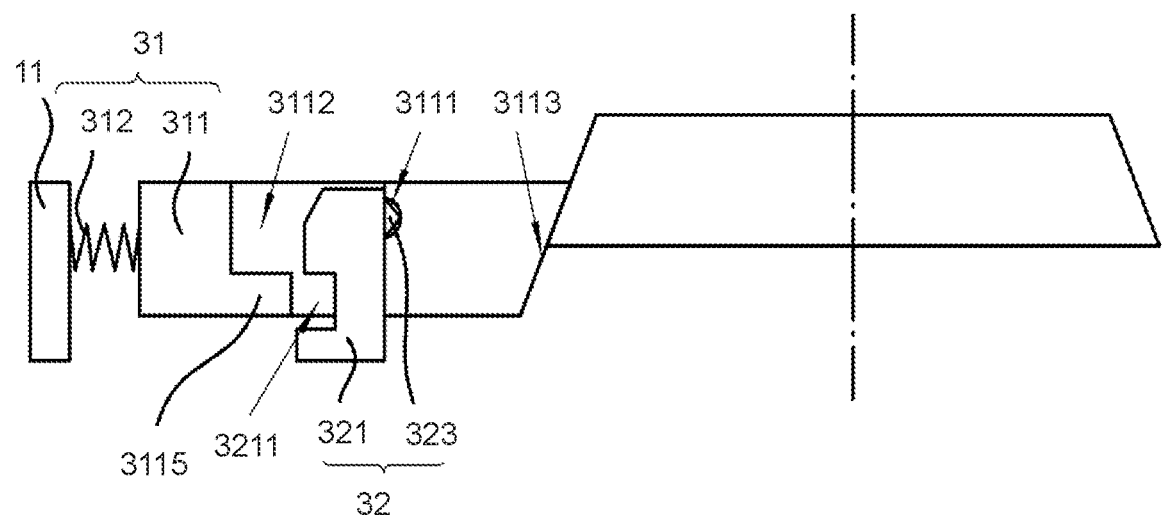
FIG. 14 is a schematic diagram illustrating structures of the first locking member and the second locking member in an unlocked state according to the third embodiment of the present disclosure.

The filter grid device provided in the third embodiment of the present disclosure has basically the same structure as the filter grid device 100 provided in the second embodiment, the main difference is that, as shown in FIGS. 13 and 14, the first locking member 311 is also provided with a groove 3111 on the basis of the second embodiment. The anti-release member 323 is capable of being clamped and limited in the groove 3111 when the second locking member 321 is unlocked with the first locking member 311, which can further improve the anti-release effect of the filter grid 2 and the housing assembly 1. It is equivalent to that the anti-release member 323 interferes with the groove 3111 and the insertion port 1111 in turn when the second locking member 321 is unlocked with the first locking member 311, making that the anti-release effect of the filter grid 2 is better.

FIG. 13 is a schematic diagram illustrating structures of the first locking member 311 and the second locking member 321 in a locked state according to the third embodiment of the present disclosure, and FIG. 14 is a schematic diagram illustrating structures of the first locking member 311 and the second locking member 321 in an unlocked state according to the third embodiment of the present disclosure. As shown in FIG. 13, when the first locking member 311 and the second locking member 321 are in the locked state, the anti-release member 323 is separated from the groove 3111. As shown in FIG. 14, when the first locking member 311 and the second locking member 321 are in the unlocked state, the anti-release member 323 is clamped and limited in the groove 3111.

Fourth Embodiment

Figure 15:
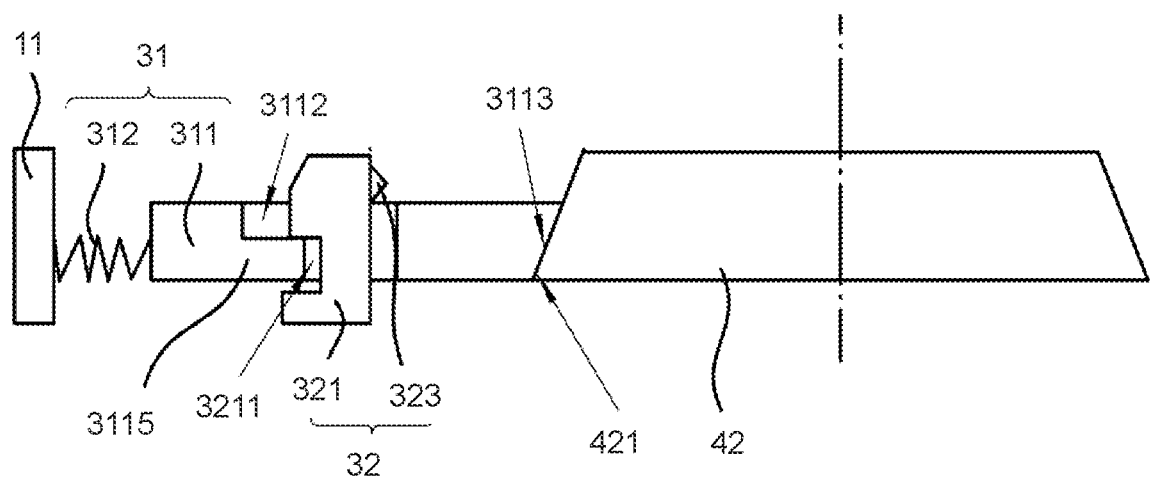
FIG. 15 is a schematic diagram illustrating structures of the first locking member and the second locking member in the locked state according to the fourth embodiment of the present disclosure.
Figure 16:
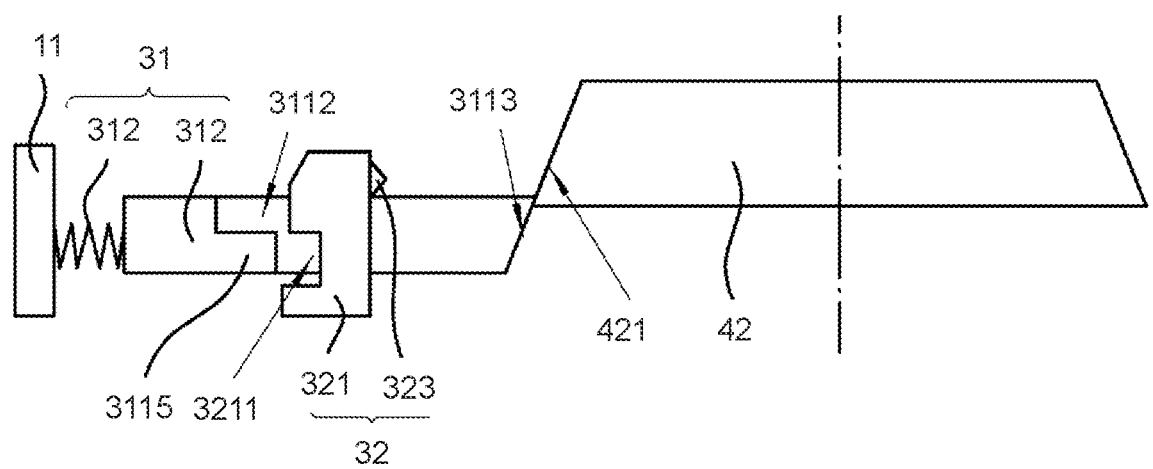
FIG. 16 is a schematic diagram illustrating structures of the first locking member and the second locking member in the unlocked state according to the fourth embodiment of the present disclosure.

The filter grid device provided in the fourth embodiment of the present disclosure has essentially the same structure as the filter grid device 100 provided in the second embodiment, the main difference is that, as shown in FIGS. 15 and 16, the first locking member 311 is provided with an accommodation groove 3112 penetrating along the thickness direction of the filter grid device 100, the second locking mechanism 32 penetrates the accommodation groove 3112, and the anti-release member 323 is capable of being stuck against and limited to the side of the first locking member 311 relatively away from the filter grid 2 when the first locking member 311 is unlocked from the second locking member 321, which can further improve the anti-release effect of the filter grid 2 and the housing assembly 1. It is equivalent to that the anti-release member 323 interferes with the groove 3111 and the insertion port 1111 in turn when the second locking member 321 is unlocked with the first locking member 311, making that the anti-release effect of the filter grid 2 is better.

FIG. 15 is a schematic diagram illustrating structures of the first locking member 311 and the second locking member 321 in a locked state according to the fourth embodiment of the present disclosure, and FIG. 16 is a schematic diagram illustrating structures of the first locking member 311 and the second locking member 321 in an unlocked state according to the fourth embodiment of the present disclosure. As shown in FIG. 15, when the first locking member 311 and the second locking member 321 are in the locked state, the anti-release member 323 is separated from the first locking member 311. As shown in FIG. 16, when the first locking member 311 and the second locking member 321 are in the unlocked state, the anti-release member 323 is stuck against and limited to the side of the first locking member 311 relatively away from the filter grid 2.

The technical features of the above-described embodiments can be combined in any number of ways. For the sake of brevity, not all possible combinations of the technical features of the above-described embodiments have been described. However, as long as there are no contradictions in the combination of these technical features, it should be considered to be within the scope of the present disclosure.

The above described embodiments express only several embodiments of the present disclosure, and their descriptions are more specific and detailed, but they should not be understood as a limitation of the scope of the patent application for this reason. It should be noted that for a person of ordinary skill in the art, a number of variations and improvements can be made without departing from the conception of the present disclosure, which belongs to the scope of protection of the present disclosure. Therefore, the scope of protection of the patent disclosure shall be subject to the attached claims.

What is claimed is:

1. An X-ray machine, comprising a C-shaped arm, the C-shaped arm including a connecting arm, a first support arm, and a second support arm, the first support arm and the second support arm being separately movably connected to the connecting arm, the first support arm being configured to be capable of moving relative to the connecting arm to move close to or away from the second support arm, the connecting arm being configured to move relative to the second support arm, and a movement of the connecting arm drives the first support arm to move close to or away from the second support arm.

2. The X-ray machine of claim 1, wherein the first support arm is provided with a detector and the second support arm is provided with a radiation source, the detector and the radiation source are separately located on both sides of a hospital bed, the first support arm and the second support arm are separately movably connected to the connecting arm, the connecting arm is configured to move relative to the hospital bed along a direction of a line connecting the detector and the radiation source, so as to have at least one of a first movement mode and a second movement mode:

in the first movement mode, the first support arm is configured to move relative to the connecting arm and the second support arm to cause the detector to move close to the hospital bed, the first support arm is driven by the connecting arm to follow toward the hospital bed while the second support arm moves relative to the connecting arm to cause the radiation source to move close to the detector;

in the second movement mode, the first support arm is configured to move relative to the connecting arm and the second support arm to cause the detector to move away from the hospital bed, the first support arm is driven by the connecting arm to follow away from the hospital bed while the second support arm moves relative to the connecting arm to cause the radiation source to move away from the detector.

3. The X-ray machine of claim 2, wherein in the first movement mode, the first support arm is configured to move relative to the connecting arm and the second support arm to cause the detector to move close to the hospital bed, wherein the first support arm reaches a maximum travel relative to the connecting arm; or in the second movement mode, the first support arm is configured to move relative to the connecting arm and the second support arm to cause the first support arm to move away from the hospital bed, wherein the first support arm reaches the maximum travel relative to the connecting arm.

4. The X-ray machine of claim 2, wherein the C-shaped arm further includes:

a first drive device configured to drive the first support arm to move relative to the connecting arm and the second support arm;

a second drive device configured to drive the connecting arm to move to drive the first support arm to move; and a third drive device configured to drive the second support arm to move relative to the connecting arm.

5. The X-ray machine of claim 4, wherein the C-shaped arm further includes a key assembly and a controller coupled to the key assembly, the controller being communicatively connected to the first drive device, the second drive device, and the third drive device, respectively, the controller being configured to control the first drive device to drive the first support arm to move, control the second drive device to drive the connecting arm to move to cause the first support arm to follow, or control the third drive device to drive the second support arm to move relative to the connecting arm in response to a press of the key assembly.

6. The X-ray machine of claim 5, wherein the key assembly includes a first key or a second key, when the first key is enabled, the controller controls the first drive device, the second drive device, and the third drive device to perform the first movement mode; or when the second key is enabled, the controller controls the first drive device, the second drive device, and the third drive device to perform the second movement mode.

7. The X-ray machine of claim 1, wherein the first support arm moves along a first path on the connecting arm and the second support arm moves along a second path on the connecting arm, the first path being parallel or co-linear with the second path.

8. The X-ray machine of claim 7, wherein a first sliding slot is arranged on one of the connecting arm and the first support arm, a first slider is arranged on the other of the connecting arm and the first support arm, the first slider is slidably connected to the first sliding slot, and a path of the first slider sliding along the first sliding slot is the first path.

9. The X-ray machine of claim 7, wherein a second sliding slot is arranged on one of the connecting arm and the second support arm, a second slider is arranged on the other of the connecting arm and the second support arm, the second slider is slidably connected to the second sliding slot, and a path of the second slider sliding along the second sliding slot is the second path.

10. The X-ray machine of claim 1, wherein the X-ray machine further includes a radiation source, a detector, and a filter grid device, the radiation source is used to emit X-rays, the detector is used to receive X-rays passing through an object to be detected, and the filter grid device is arranged between the object to be detected and the detector.

11. The X-ray machine of claim 10, wherein the filter grid device includes a housing assembly and a filter grid covered with the housing assembly, and the filter grid device further includes:
- a locking assembly including a first locking mechanism arranged on the housing assembly and a second locking mechanism arranged on the filter grid, the first locking mechanism and the second locking mechanism being locked to each other; and
- a trigger assembly, the trigger assembly being connected to the housing assembly and capable of driving the first locking mechanism to slide relative to the second locking mechanism to release the lock between the first locking mechanism and the second locking mechanism after being pressed.

12. The X-ray machine of claim 11, wherein the trigger assembly has a gap formed between a front face of the trigger assembly and a rear face of the filter grid in a thickness direction of the filter grid device in a limit state after being pressed.

13. The X-ray machine of claim 11, wherein the housing assembly includes a housing, the first locking mechanism and the trigger assembly are connected to the housing;
the second locking mechanism includes a second locking member, a second reset member, and an anti-release member, the second locking member and the first locking mechanism are locked with each other, the anti-release member is connected to and protruded on the second locking member by the second reset member, and the anti-release member is capable of sliding relative to the second locking member; and
the housing is provided with an insertion port for extension of the second locking member, the anti-release member is capable of being stuck against and limited to a side wall of the insertion port when releasing the lock between the second locking member and the first locking mechanism.

14. The X-ray machine of claim 13, wherein the first locking mechanism includes a first locking member and a first reset member, the first locking member is connected to the housing by the first reset member, and the first reset member drives the second locking member and the first locking member to lock each other.

15. The X-ray machine of claim 14, wherein the first locking member is provided with a groove, the anti-release member is capable of being clamped and limited in the groove when releasing the lock between the second locking member and the first locking member.

16. The X-ray machine of claim 14, wherein the first locking member is provided with an accommodation groove penetrating in a thickness direction of the filter grid device, the second locking mechanism penetrates the accommodation groove, the anti-release member is capable of being stuck against and limited to a side of the first locking member away from the filter grid when releasing the lock between the first locking member and the second locking member.

17. The X-ray machine of claim 15, wherein the trigger assembly includes a trigger member and a sliding member, the sliding member is provided with a first bevel, the first locking member is provided with a second bevel against the first bevel, the trigger member is capable of being pressed and driving the sliding member to slide in a pressed direction to drive the first locking member to slide relative to the second locking member.

18. The X-ray machine of claim 17, wherein the housing assembly further includes a first guiding mechanism, the first guiding mechanism includes a first guiding member and a first positioning member, the first positioning member is fixedly connected to the housing, one of the sliding member and the first positioning member is provided with the first guiding member and the other of the sliding member and the first positioning member is provided with a first guiding hole, the first guiding member extends into the first guiding hole and is capable of guiding a sliding process of the trigger assembly relative to the housing.

19. An X-ray machine, comprising: a frame, a radiation source, a detector and a C-shaped arm; the C-shaped arm including a connecting arm, a first support arm, and a second support arm, wherein the first support arm and the second support arm are both drivable connected to the connecting arm, the first support arm being configured to be capable of moving relative to the connecting arm to move close to or away from the second support arm, the connecting arm being configured to move relative to the second support arm, and a movement of the connecting arm drives the first support arm to move close to or away from the second support arm; the C-shaped arm is arranged on the frame, the detector is arranged on the first support arm, and the radiation source is arranged on the second support arm; and the X-ray machine includes at least one of a SID reduction manipulation mode and a SID increase manipulation mode:
- in the SID reduction manipulation mode, the first support arm is configured to move relative to the connecting arm and the second support arm to cause the detector to move close to a hospital bed, and the first support arm is driven by the connecting arm to follow toward the hospital bed and the second support arm moves relative to the connecting arm to cause the radiation source to move close to the detector; or
- in the SID increase manipulation mode, the first support arm is configured to move relative to the connecting arm and the second support arm to cause the detector to move away from the hospital bed, and the first support arm is driven by the connecting arm to follow away from the hospital bed and the second support arm moves relative to the connecting arm to cause the radiation source to move away from the detector.

20. An X-ray machine, comprising a frame, a radiation source, a detector, and a C-shaped arm; the C-shaped arm including a connecting arm, a first support arm, and a second support arm, the first support arm and the second support arm both being drivable connected to the connecting arm, the first support arm being configured to be capable of moving relative to the connecting arm to move close to or away from the second support arm, the connecting arm being configured to move relative to the second support arm, and a movement of the connecting arm drives the first support arm to move close to or away from the second support arm; the C-shaped arm being arranged on the frame, the detector being arranged on the first support arm, and the radiation source being arranged on the second support arm; and the X-ray machine including at least one of a SID reduction manipulation mode and a SID increase manipulation mode:
- in the SID reduction manipulation mode, a compound movement including two movements: the first support arm configured to move toward a hospital bed relative to the connecting arm; and the second support arm configured to move toward the hospital bed relative to the connecting arm; and
- in the SID increase manipulation mode, a compound movement including two movements: the first support arm configured to move away from the hospital bed relative to the connecting arm; and the second support arm configured to move away from the hospital bed relative to the connecting arm.

* * * * *